United States Patent
Amano

(10) Patent No.: US 8,811,473 B2
(45) Date of Patent: Aug. 19, 2014

(54) MOVING PICTURE DECODING DEVICE, MOVING PICTURE DECODING METHOD, MOVING PICTURE DECODING SYSTEM, INTEGRATED CIRCUIT, AND PROGRAM

(75) Inventor: Hiroshi Amano, Osaka (JP)

(73) Assignee: Panasonic Corporation, Osaka (JP)

( * ) Notice: Subject to any disclaimer, the term of this patent is extended or adjusted under 35 U.S.C. 154(b) by 169 days.

(21) Appl. No.: 13/126,040

(22) PCT Filed: Jun. 16, 2010

(86) PCT No.: PCT/JP2010/003986
§ 371 (c)(1), (2), (4) Date: Apr. 26, 2011

(87) PCT Pub. No.: WO2011/004551
PCT Pub. Date: Jan. 13, 2011

(65) Prior Publication Data
US 2011/0211635 A1    Sep. 1, 2011

(30) Foreign Application Priority Data
Jul. 7, 2009    (JP) ................................ 2009-160925

(51) Int. Cl.
*H04N 7/28* (2006.01)
*H04N 7/36* (2006.01)
*H04N 7/26* (2006.01)
*H04N 7/68* (2006.01)

(52) U.S. Cl.
CPC ..... *H04N 19/0063* (2013.01); *H04N 19/00533* (2013.01); *H04N 19/00939* (2013.01)
USPC .................................................. 375/240.02

(58) Field of Classification Search
CPC .................... H04N 19/00533; H04N 19/0063; H04N 19/00939
USPC ....................................................... 375/240
See application file for complete search history.

(56) References Cited

U.S. PATENT DOCUMENTS 6,327,307 B1 * 12/2001 Brailean et al. ........... 375/240.29
6,330,344 B1 * 12/2001 Kondo et al. ................. 382/107

(Continued)

FOREIGN PATENT DOCUMENTS

| CN | 101141650 | 3/2008 |
| JP | 9-182076 | 7/1997 |

(Continued)

OTHER PUBLICATIONS

International Search Report issued Sep. 14, 2010 in International (PCT) Application No. PCT/JP2010/003986.

(Continued)

*Primary Examiner* — Dave Czekaj
*Assistant Examiner* — Md Haque
(74) *Attorney, Agent, or Firm* — Wenderoth, Lind & Ponack, L.L.P.

(57) ABSTRACT

To provide a moving picture decoding device capable of continuing motion compensation even when an error is included in a filter coefficient for motion compensation. The moving picture decoding device includes: a decoding unit (1001) which decodes (i) a motion vector indicating a sub-pixel position and (ii) a filter coefficient for identifying a pixel value at the sub-pixel position, the motion vector and the filter coefficient being included in a coded stream; an error detecting unit (1002) which detects an error in the filter coefficient; a modifying unit (1010) which modifies one of the motion vector and the filter coefficient so as to enable identification of a pixel value at a pixel position for motion compensation, when the error is detected; and a motion compensation unit (1007) which performs motion compensation by identifying the pixel value at the pixel position using the modified one, when the error is detected.

8 Claims, 25 Drawing Sheets

(56) References Cited

U.S. PATENT DOCUMENTS

| | | | |
|---|---|---|---|
| 6,418,166 B1 * | 7/2002 | Wu et al. | 375/240.12 |
| 7,483,479 B2 * | 1/2009 | Callicotte et al. | 375/232 |
| 7,881,376 B2 * | 2/2011 | Iguchi et al. | 375/240.12 |
| 8,009,731 B2 | 8/2011 | Kadono et al. | |
| 2002/0041626 A1 * | 4/2002 | Yoshioka et al. | 375/240 |
| 2005/0062885 A1 | 3/2005 | Kadono et al. | |
| 2005/0226333 A1 * | 10/2005 | Suzuki et al. | 375/240.16 |
| 2005/0254581 A1 | 11/2005 | Iguchi et al. | |
| 2009/0022220 A1 | 1/2009 | Vatis et al. | |
| 2009/0323821 A1 | 12/2009 | Sugimoto et al. | |
| 2011/0286527 A1 | 11/2011 | Kadono et al. | |

FOREIGN PATENT DOCUMENTS

| | | |
|---|---|---|
| JP | 2003-179937 | 6/2003 |
| JP | 3496378 | 11/2003 |
| JP | 2006-279388 | 10/2006 |
| JP | 3852594 | 11/2006 |
| JP | 2008-536414 | 9/2008 |
| WO | 2006/108654 | 10/2006 |
| WO | 2008/078807 | 7/2008 |

OTHER PUBLICATIONS

Thomas Wedi, "*Adaptive Interpolation Filter for Motion Compensated Hybrid Video Coding*", Proc. Picture Coding Symposium (PCS2001), Seoul, Korea, pp. 1-4, Apr. 2001.

Y. Vatis et al., "*Two Dimensional no-separable Adaptive Wiener Interpolation Filter for H.264/AV*" ITU-Telecommunications Standardization Sector Study Group 16 Question 6 Video Coding Experts Group (VCEG) document VCEG-Z17, pp. 1-5, Apr. 16, 2005.

Kai Zhang et al., "*Single-Pass Encoding Using Multiple Adaptive Interpolation Filters*" ITU-Telecommunications Standardization Sector Study Group 16 Question 6 Video Coding Experts Group (VCEG) document VCEG-AK26, pp. 1-7, Apr. 15-18, 2009.

Office Action and Search Report mailed Oct. 10, 2013 in corresponding Chinese Application No. 201080003078.9, with English translation of Search Report.

\* cited by examiner

MOVING PICTURE DECODING DEVICE, MOVING PICTURE DECODING METHOD, MOVING PICTURE DECODING SYSTEM, INTEGRATED CIRCUIT, AND PROGRAM

TECHNICAL FIELD

The present invention relates to moving picture decoding devices and moving picture decoding methods using motion compensation.

BACKGROUND ART

Examples of standardized standards of video compression techniques that have been widely used these days include, for example, H.261 and H.263 by the ITU-T (International Telecommunication Union Telecommunication Standardization Sector). Other examples include MPEG (Moving Picture Experts Group)-1, MPEG-2, MPEG-4, etc. by the ISO/IEC (International Organization for Standardization/International Electrotechnical Commission).

Other examples include H.264/MPEG-4 AVC (Advanced Video Coding) by the JVT (Joint Video Team) as a joint team of the ITU-T and the MPEG. Furthermore, the next generation video compression technique is now being studied by the ITU-T, the ISO/IEC, etc.

In general, one of the important elements of a video compression technique is inter-picture prediction using motion compensation intended to compress the amount of information by reducing temporal redundancies between plural consecutive pictures that make up a video.

The inter-picture prediction using motion compensation is a coding method involving (i) detecting the amount and direction of a motion in a reference picture located forward or backward of a current picture that is to be coded in units of a macroblock or a sub-macroblock (hereinafter also referred to as a "macroblock or the like"), (ii) generating a prediction picture, and (iii) coding a difference value between the prediction picture and the current picture.

The information indicating how much and to what direction a macroblock or the like in the current picture to be coded is moved in the reference picture located forward or backward of the current to picture is indicated as a motion vector. In short, the motion vector indicates the pixel position within the reference picture. The reference picture is a picture to be referred to by the current picture.

In order to generate a prediction picture having a sub-pixel accuracy, filtering is applied to the integer pixels. For example, in H.264, a prediction picture having a ½ pixel accuracy is generated using a 6-tap FIR filter (filter coefficients: 1, −5, 20, 20, −5, and 1) that has fixed filter coefficients defined in the standard. Next, a prediction picture having a ¼ pixel accuracy is generated using a 2-tap average-value filter (filter coefficients: ½ and ½) that has fixed filter coefficients defined in the standard.

Here, the filter coefficients for generating such a prediction picture having a sub-pixel accuracy are always the same irrespective of the image characteristics. The generated prediction picture having a sub-pixel accuracy is used when a motion vector indicates a pixel position of a sub-pixel accuracy.

On the other hand, one of the techniques proposed as the next generation video compression technique by the ITU-T, ISO/IEC, etc. is a motion compensation technique for adaptively changing a filter coefficient for generating a prediction picture having a sub-pixel accuracy according to the image characteristics (the motion compensation technique is hereinafter also referred to as "motion compensation using variable coefficients") (See NPLs 1, 2, and 3). In the motion compensation using variable coefficients, filter coefficient information for use in decoding is included in a coded stream.

The motion compensation using variable coefficients yields a prediction picture according to the image characteristics, which increases the coding efficiency.

In some cases, a stream coded according to a video compression technique, received, and to be decoded includes an error. When an error is included, a video decoding device which decodes a video may stop the decoding upon detection of the error. However, when the decoding is stopped, a user who is a viewer of the video cannot view the video including the error.

To prevent this, the video decoding device performs processing called error concealment intended to continue decoding in such a manner that the error is concealed as much as possible so as not to stop the decoding. An example of representative error concealment techniques is a method of using a motion vector of a nearby macroblock instead of Using a motion vector of a current macroblock to be coded, when an error is detected in the motion vector of the current macroblock.

CITATION LIST

Patent Literature

[PTL 1]
  Japanese Patent Publication No. 3496378
[PTL 2]
  Japanese Patent Publication No. 3852594
[Non Patent Literature]
[NPL 1]
  "ADAPTIVE INTERPOLATION FILTER FOR MOTION COMPENSATED HYBLID VIDEO CODING", written by Thomas Wedi, Proc. Picture Coding Symposium (PCS2001), Seoul, Korea, April, 2001
[NPL 2]
  "Two Dimensional no-separatable Adaptive Wiener Interpolation Filter for H.264/AVC", written by Y. Vatis et al., ITU-Telecommunications Standardization Sector, STUDY GROUP 16, Question 6 Video Coding Experts Group (VCEG) document VCEG-Z17, 16 April, 2005
[NPL 3]
  "Single-Pass Encoding Using Multiple Adaptive Interpolation Filters", written by Kai Zhang et al., ITU-Telecommunications Standardization Sector, STUDY GROUP 16, Question 6 Video Coding Experts Group (VCEG) document VCEG-AK26, 15-18, April, 2009

SUMMARY OF INVENTION

Technical Problem

However, the conventional art does not assume a case where an error is included in a filter coefficient for use in variable-coefficient motion compensated inter-picture prediction proposed as the next generation video compression technique. Accordingly, when an error is included in a filter coefficient, there is a possibility that motion compensation is stopped even when an error in a motion vector is concealed, and thus that the decoding of a video is stopped. In this case, a user who is a viewer of the video cannot view the video including the error.

The present invention has been conceived in view of this, and has an object to provide moving picture decoding devices which are capable of continuing motion compensation even when an error is included in a filter coefficient for use in motion compensation.

Solution to Problem

In order to solve the aforementioned problem, a moving picture decoding device according to the present invention is intended to perform motion compensation and includes: a decoding unit configured to decode (i) a motion vector indicating a sub-pixel position and (ii) a filter coefficient for identifying a pixel value at the sub-pixel position, the motion vector and the filter coefficient being included in a coded stream; an error detecting unit configured to detect an error in the filter coefficient; a modifying unit configured to modify one of the motion vector and the filter coefficient so as to enable identification of a pixel value at a pixel position for use in motion compensation, when the error is detected; and a motion to compensation unit configured to perform motion compensation by identifying the pixel value at the pixel position using the modified one of the motion vector and the filter coefficient, when the error is detected.

With this, the moving picture decoding device according to the present invention can continue the motion compensation even when the error is included in the filter coefficient for use in motion compensation.

In addition, the modifying unit may be configured to modify the motion vector into a motion vector indicating an integer pixel position, when the error is detected, and the motion compensation unit may be configured to perform the motion compensation by identifying the pixel value at the integer pixel position indicated by the modified motion vector, when the error is detected.

In this way, the pixel position indicated by the motion vector is modified into the integer pixel position. Accordingly, the moving picture decoding device according to the present invention can continue the motion compensation without using the filter coefficient including the error.

In addition, the modifying unit may be configured to modify the motion vector by rounding down, rounding up, or rounding off a decimal portion of the motion vector, when the error is detected.

In this way, the pixel position indicated by the motion vector is modified into the nearby integer pixel position. Accordingly, image quality degradation is suppressed.

In addition, the modifying unit may be configured to modify the motion vector into zero, when the error is detected.

In this way, the pixel position at the pixel position for use in in motion compensation is identified in such a more reliable manner.

In addition, the modifying may be configured to modify the filter coefficient so as to enable the identification of the pixel value at the sub-pixel position indicated by the motion vector, when the error is detected, and the motion compensation unit may be configured to perform motion compensation by identifying the pixel value at the sub-pixel position indicated by the motion vector, using the modified filter coefficient, when the error is detected.

In this way, the moving picture decoding device according to the present invention can identify the pixel value at the pixel position for use in motion compensation. Accordingly, the moving picture decoding device according to the present invention can continue the motion compensation even when the error is included in the filter coefficient.

In addition, the modifying unit may be configured to modify the filter coefficient into a predetermined value, when the error is detected.

In this way, the predetermined value is used as the filter coefficient when the error is included in the filter coefficient. Accordingly, the moving picture decoding device according to the present invention can continue the motion compensation even when the error is included in the filter coefficient.

In addition, the modifying unit may be configured to modify the filter coefficient such that the pixel value at the sub-pixel position corresponds to an average value of plural pixel values at plural integer pixel positions that surround the sub-pixel position, when the error is detected.

In this way, the pixel value of the nearby pixel is used in the motion compensation. Accordingly, image quality degradation is suppressed.

In addition, the decoding unit may be configured to decode one or more filter coefficients before decoding the filter coefficient, the moving picture decoding device may further include a filter coefficient memory unit configured to store the decoded one or more filter coefficients, and wherein the modifying unit may be configured to modify the filter coefficient into one of the one or more filter coefficients stored in the filter coefficient memory unit, when the error is detected.

Accordingly, one of the previously decoded filter coefficients is used, when the error is included in the filter coefficient. Accordingly, the moving picture decoding device according to the present invention can continue the motion compensation even when the filter coefficient includes the error.

In addition, the modifying unit may be configured to modify the filter coefficient into one of the one or more filter coefficients that is of a picture that is closest in decoding order to a current picture to be decoded, when the error is detected.

In this way, complexity of the processing is reduced.

In addition, the modifying unit may be configured to modify the filter coefficient into one of the one or more filter coefficients that is of a picture that is closest in display order to a current picture to be decoded, when the error is detected.

In this way, the filter coefficient of the temporally closest picture is used. Accordingly, image quality degradation is suppressed.

In addition, the modifying unit may be configured to modify the filter coefficient into one of the one or more filter coefficients that is of a block that is spatially closest within the current picture to be decoded, when the error is detected.

In this way, the filter coefficient of the spatially closest block is used. Accordingly, image quality degradation is suppressed.

In addition, the moving picture decoding device may further include a filter coefficient generating unit configured to generate a new filter coefficient for identifying the pixel value at the sub-pixel position indicated by the motion vector, wherein the modifying unit may be configured to modify the filter coefficient into the new filter coefficient, when the error is detected.

In this way, the new filter coefficient is used, when the error is included in the filter coefficient. Accordingly, the moving picture decoding device according to the present invention can continue the motion compensation even when the filter coefficient includes the error.

In addition, the filter coefficient generating unit may be configured to generate the new filter coefficient within a predetermined range.

In this way, a new filter coefficient is generated such that an abnormal value is not generated.

In addition, the filter coefficient generating unit may be configured to generate the new filter coefficient such that the pixel value at the sub-pixel position indicated by the motion vector falls within a predetermined range.

In this way, a new filter coefficient is generated such that an abnormal value is not generated as the pixel value at the pixel position for use in motion compensation.

In addition, the filter coefficient generating unit may be configured to generate the new filter coefficient using a same filter coefficient generating method as in coding.

In this way, the moving picture decoding device according to the present invention can perform the motion compensation using the same filter coefficient as in coding. Accordingly, image quality degradation is suppressed.

In addition, the filter coefficient generating unit may be configured to generate an error-free filter coefficient as the new filter coefficient by pre-reading the coded stream.

In this way, when the error is included in the current filter coefficient, the filter coefficient that is to be used in the future is used instead. Accordingly, the moving picture decoding device according to the present invention can continue the motion compensation even when the filter coefficient includes the error.

Furthermore, an integrated circuit according to the present invention may be intended to perform motion compensation and include: a decoding unit configured to decode (i) a motion vector indicating a sub-pixel position and (ii) a filter coefficient for identifying a pixel value at the sub-pixel position, the motion vector and the filter coefficient being included in a coded stream; an error is detecting unit configured to detect an error in the filter coefficient; a modifying unit configured to modify one of the motion vector and the filter coefficient so as to enable identification of a pixel value at a pixel position for use in motion compensation, when the error is detected; and a motion compensation unit configured to perform motion compensation by identifying the pixel value at the pixel position using the modified one of the motion vector and the filter coefficient, when the error is detected.

In this way, the moving picture decoding device according to the present invention can be implemented as the integrated circuit.

Furthermore, a moving picture decoding method according to the present invention may be intended to perform motion compensation and include: decoding (i) a motion vector indicating a sub-pixel position and (ii) a filter coefficient for identifying a pixel value at the sub-pixel position, the motion vector and the filter coefficient being included in a coded stream; detecting an error in the filter coefficient; modifying one of the motion vector and the filter coefficient so as to enable identification of a pixel value at a pixel position for use in motion compensation, when the error is detected; and performing motion compensation by identifying the pixel value at the pixel position using the modified one of the motion vector and the filter coefficient, when the error is detected.

In this way, the moving picture decoding device according to the present invention can be implemented as the moving picture decoding method.

Furthermore, a moving picture decoding system according to the present invention may be intended to perform motion compensation and include: an integrated circuit which performs motion compensation; and a memory for storing a reference picture, wherein the integrated circuit including: a decoding unit configured to decode (i) a motion vector indicating a sub-pixel position and (ii) a filter coefficient for identifying a pixel value at the sub-pixel position, the motion vector and the filter coefficient being included in a coded stream; an error detecting unit configured to detect an error in the filter coefficient; a modifying unit configured to modify one of the motion vector and the filter coefficient so as to enable identification of a pixel value at a pixel position for use in motion compensation, when the error is detected; and a motion compensation unit configured to perform motion compensation by identifying the pixel value at the pixel position using the modified one of the motion vector and the filter coefficient, when the error is detected.

In this way, the moving picture decoding device according to the present invention can be implemented as the moving picture decoding system.

Furthermore, a program according to the present invention may be intended to cause a computer to execute the above-described moving picture decoding method.

In this way, the moving picture decoding method according to the present invention can be implemented as the program.

Advantageous Effects of Invention

The present invention makes it possible to continue motion compensation even when an error is included in a filter coefficient for use in motion compensation.

BRIEF DESCRIPTION OF DRAWINGS

FIG. 1 is a diagram showing a structure of a moving picture decoding device according to Embodiment 1.
FIG. 2 is a flowchart indicating processes performed by a moving picture decoding device according to Embodiment 1.
FIG. 3 is a diagram showing a unique structure of a moving picture decoding device according to Embodiment 1.
FIG. 4 is a diagram showing a structure of a moving picture decoding device according to Embodiment 2.
FIG. 5 is a flowchart indicating processes performed by a moving picture decoding device according to Embodiment 2.
FIG. 6 is a diagram showing a unique structure of a moving picture decoding device according to Embodiment 2.
FIG. 7 is a diagram showing a structure of a moving picture decoding device according to Embodiment 3.
FIG. 8 is a flowchart indicating processes performed by a moving picture decoding device according to Embodiment 3.
FIG. 9 is a diagram showing a unique structure of a moving picture decoding device according to Embodiment 3.
FIG. 10 is a diagram showing a structure of a moving picture decoding device according to Embodiment 4.
FIG. 11 is a flowchart indicating processes performed by a moving picture decoding device according to Embodiment 4.
FIG. 12 is a diagram showing a unique structure of a moving picture decoding device according to Embodiment 4.
FIG. 13 is a diagram showing a structure of a moving picture decoding device according to Embodiment 5.

FIG. 14 is a flowchart indicating processes performed by a moving picture decoding device according to Embodiment 5.
FIG. 15 is a diagram showing a structure of a moving picture decoding device according to Embodiment 6.
FIG. 16 is a flowchart indicating processes performed by a moving picture decoding device according to Embodiment 6.
FIG. 17 is a diagram showing a unique structure of a moving in picture decoding device according to Embodiment 7.
FIG. 18 is a diagram showing a structure of a moving picture decoding device according to Embodiment 8.
FIG. 19 shows an overall configuration of a content providing system for implementing content distribution services according to Embodiment 9.
FIG. 20 shows an overall configuration of a digital broadcasting system according to Embodiment 9.
FIG. 21 is a block diagram showing an example of a configuration of a television according to Embodiment 9.
FIG. 22 is a block diagram showing an example of a configuration of an information reproducing and recording unit that reads and writes information from and on a recording medium that is an optical disk.
FIG. 23 shows an example of a configuration of a recording medium that is an optical disk.
FIG. 24 is a diagram showing a structure of an integrated circuit which performs moving picture decoding processes.
FIG. 25 is a diagram showing an example of a structure of an integrated circuit which performs moving picture coding processes and moving picture decoding processes.

DESCRIPTION OF EMBODIMENTS

Figure 1:
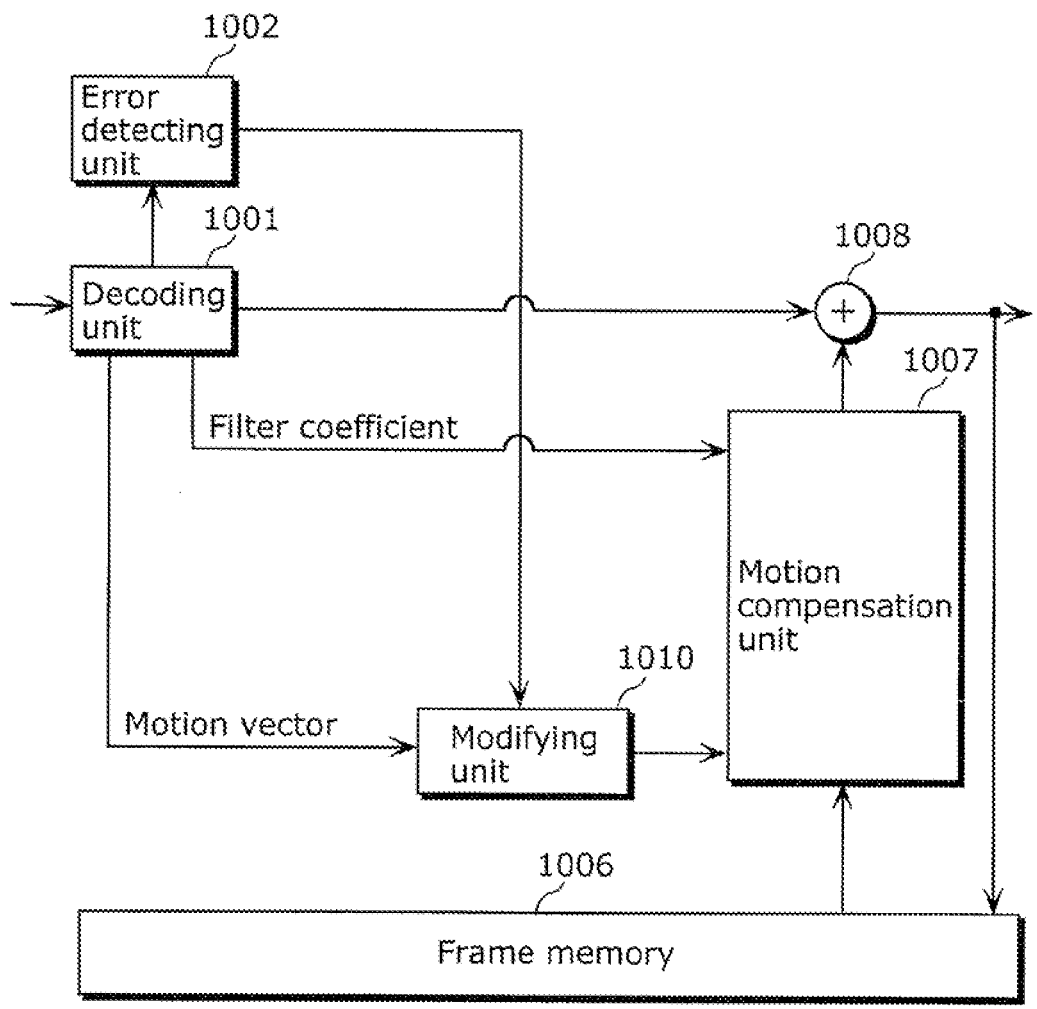
[FIG. 1]
Figure 2:
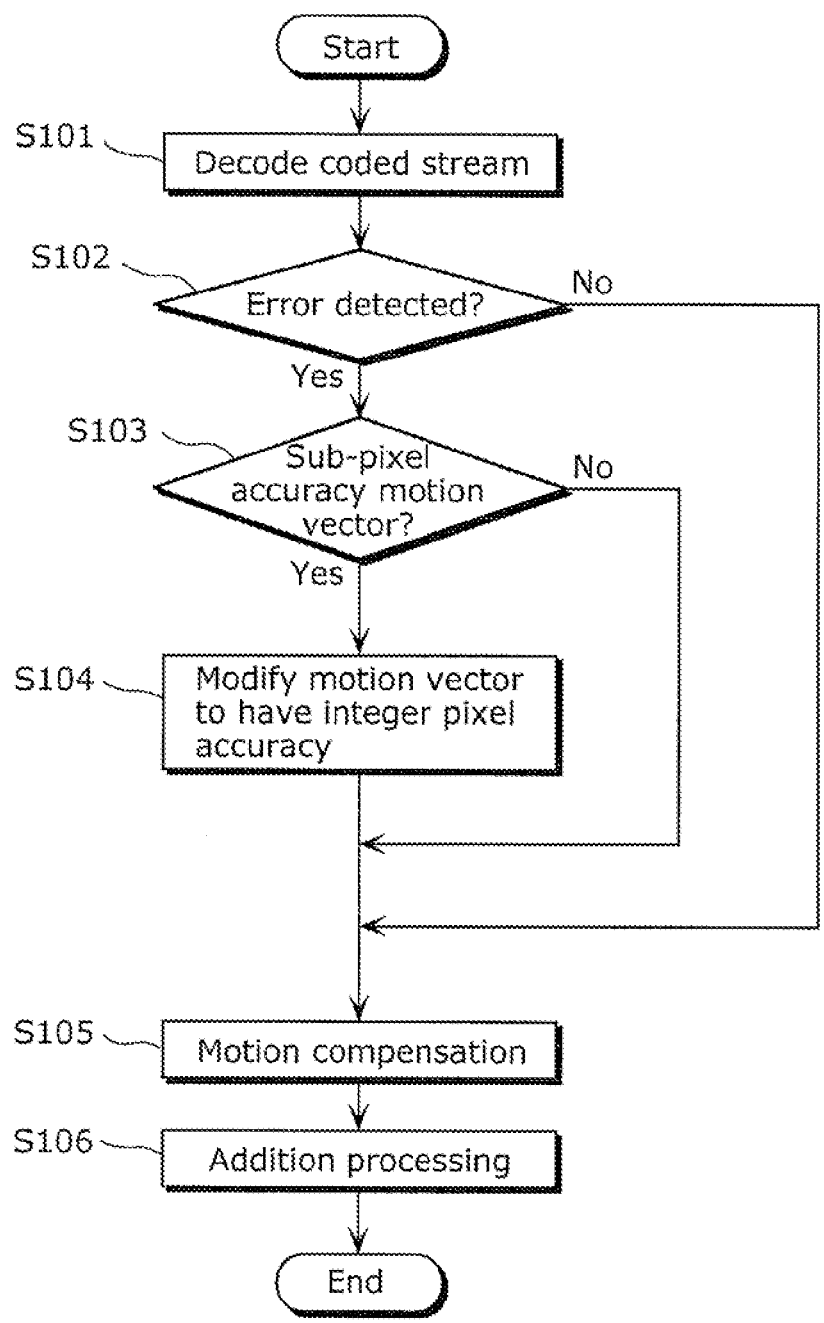
[FIG. 2]

Embodiments of the present invention are described below with reference to the drawings.
[Embodiment 1]
FIG. 1 is a diagram showing a structure of a moving picture decoding device according to Embodiment 1.
The moving picture decoding device shown in FIG. 1 includes a decoding unit 1001, an error detecting unit 1002, a frame memory 1006, a motion compensation unit 1007, an adder unit 1008, and a modifying unit 1010.
The decoding unit 1001 has functions of decoding a coded stream in accordance with the standardized standard of a video compression technique and outputting header information and a prediction error signal.
The header information includes at least: information regarding a filter coefficient for use in motion compensation (hereinafter also referred to as "motion compensation filter coefficient information" or simply as "filter coefficient"; and a motion vector for use in motion compensation.
The filter coefficient information for use in motion compensation is for identifying the pixel value at a sub-pixel position. The filter coefficient information for use in motion compensation may be determined in units of a picture, a slice, or a block. The motion vector is information indicating a pixel position.
The error detecting unit 1002 has a function of detecting an error in a filter coefficient information for use in motion compensation defined in the coded stream, when the filter coefficient information for use in motion compensation does not conform to the standardized standard of the video compression technique. Examples of such an error in the filter coefficient information for use in motion compensation includes a case where no necessary filter coefficient information for use in motion compensation exists in a coded stream, a case where the format of the filter coefficient information for use in motion compensation is different from the predetermined format.
The modifying unit 1010 has a function of modifying a motion vector into a motion vector having an integer accuracy, when an error is detected by the error detecting unit 1002 and a motion vector decoded by the decoding unit 1001 is a motion vector having a sub-pixel accuracy. In short, the modifying unit 1010 modifies a motion vector indicating a sub-pixel position into a motion vector indicating an integer pixel position.
The frame memory 1006 has a function of storing a reference picture to be referred to by the motion compensation unit 1007.
The motion compensation unit 1007 has functions of obtaining the reference picture from the frame memory 1006 based on the motion vector, and performing motion compensation.
For example, when no error is detected by the error detecting unit 1002, the motion compensation unit 1007 performs motion compensation, using a reference picture obtained from the frame memory 1006, a decoded filter coefficient information for use in motion compensation, and a decoded motion vector.
On the other hand, when an error is detected by the error detecting unit 1002, the motion compensation unit 1007 performs motion compensation, using a reference picture obtained from the frame memory 1006, a decoded filter coefficient information for use in motion compensation, and a modified motion vector.
Next, the motion compensation unit 1007 performs the motion compensation so as to generate a prediction picture. Furthermore, the motion compensation unit 1007 outputs the generated prediction picture to the adder unit 1008.
The adder unit 1008 has a function of adding the prediction in error signal and the prediction picture.
The next description is given of operations in decoding processing performed by the moving picture decoding device shown in FIG. 1
FIG. 2 is a flowchart showing processes performed by the moving picture decoding device shown in FIG. 1.
First, the decoding unit 1001 reads a coded stream, and decodes header information and a prediction error signal included in the coded stream. Next, the decoding unit 1001 outputs, as header information, the decoded filter coefficient information for use in motion compensation and motion vector information. Furthermore, the decoding unit 1001 outputs the decoded prediction error signal (S101).
When an error is included in the filter coefficient information for use in motion compensation in the coded stream, the error detecting unit 1002 detects the error (S102).
When an error is detected by the error detecting unit 1002 (Yes in S102), the modifying unit 1010 determines whether or not the motion vector information decoded by the decoding unit 1001 is a motion vector having an integer accuracy or a motion vector having a sub-pixel accuracy (S103). When the motion vector is found to have a sub-pixel accuracy as a result of the determination (Yes in S103), the modifying unit 1010 modifies the motion vector into a motion vector having an integer accuracy (S104).

On the other hand, when no error is detected (No in S102), or when an error is detected in a motion vector having an integer accuracy (No in S103), the modifying unit 1010 does not perform any modification (S104).

Next, the motion compensation unit 1007 obtains, based on the motion vector, a reference picture for use in motion compensation from the frame memory 1006, and performs motion compensation by identifying the pixel value at the pixel position indicated by the motion vector (S105).

Here, when no error is detected by the error detecting unit 1002, the motion compensation unit 1007 performs motion compensation by identifying the pixel value at the pixel position indicated by the decoded motion vector, based on the decoded filter coefficient information for use in motion compensation and the decoded motion vector.

The motion compensation unit 1007 is capable of identifying the pixel value at a sub-pixel position using decoded filter coefficient information for use in motion compensation, when no error is detected. Accordingly, the motion compensation unit 1007 is capable of performing motion compensation by identifying the pixel value at the sub-pixel position, even when the decoded motion vector indicates a sub-pixel position.

On the other hand, when an error is detected by the error detecting unit 1002, the motion compensation unit 1007 performs motion compensation by identifying the pixel value at the integer pixel position indicated by the modified motion vector. Since the modified motion vector indicates the integer pixel position, the motion compensation unit 1007 can identify the pixel value at the pixel position for use in motion compensation without using the filter coefficient information for use in motion compensation.

In addition, even when the error is detected by the error detecting unit 1002, the motion compensation unit 1007 performs the motion compensation by identifying the pixel value at the integer pixel position indicated by the decoded motion vector. Also in this case, the motion compensation unit 1007 can identify the pixel value at the pixel position for use in motion compensation without using filter coefficient information for use in motion compensation.

Next, the motion compensation unit 1007 performs motion compensation so as to generate a prediction picture, and outputs the generated prediction picture to the adder unit 1008.

The adder unit 1008 adds the prediction picture output by the motion compensation unit 1007 and the prediction error signal output by the decoding unit 1001 so as to generate a picture (S106). Next, the adder unit 1008 outputs the generated picture.

Figure 3:
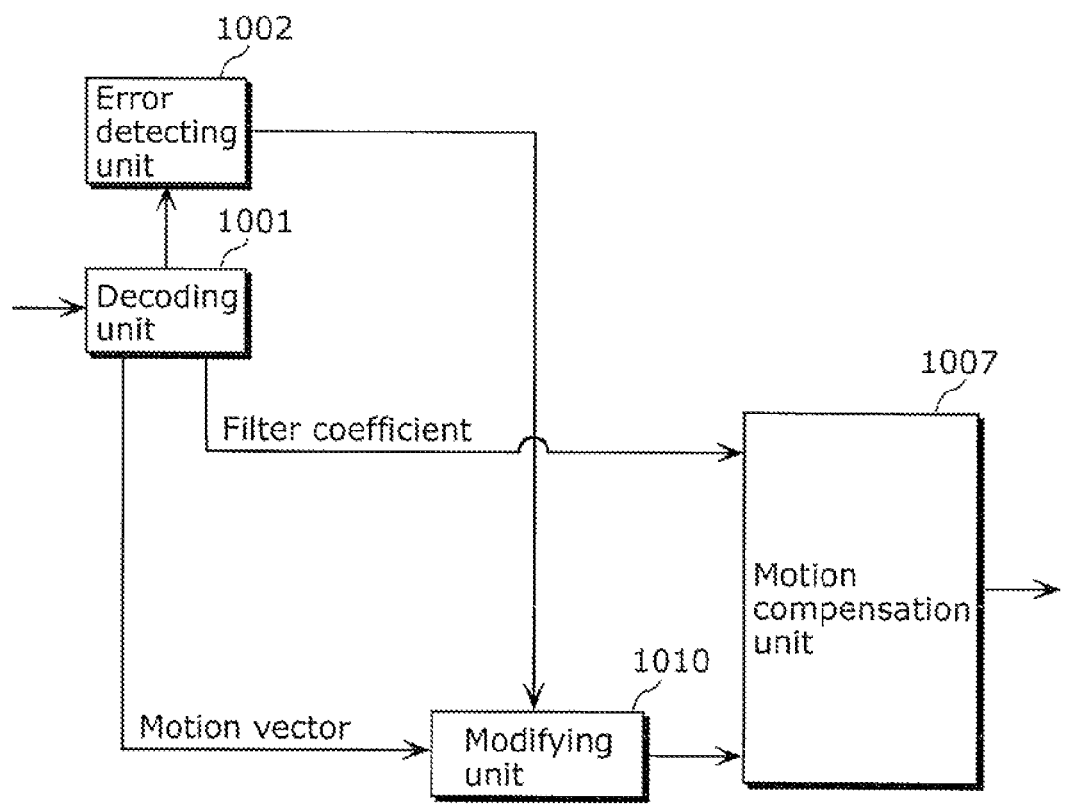
[FIG. 3]

FIG. 3 is a diagram showing a unique structure of the moving picture decoding device shown in FIG. 1. The moving picture decoding device shown in FIG. 3 includes a decoding unit 1001, an error detecting unit 1002, a motion compensation unit 1007, and a modifying unit 1010. Each of the structural elements shown in FIG. 3 has the same function as that of the corresponding one of the structural elements shown in FIG. 1.

The moving picture decoding device shown in FIG. 3 does not include a frame memory 1006 and an adder unit 1008. For example, these structural elements may be outside the moving picture decoding device. The motion compensation unit 1007 may obtain a reference picture from an external memory, and output a prediction picture to an external adder. The external adder adds the prediction error signal decoded by the decoding unit 1001 and the prediction picture generated by the motion compensation unit so as to generate a picture.

With the structure shown in FIG. 3, the motion compensation does not stop even when an error is included in filter coefficient information for use in motion compensation. Accordingly, the motion compensation is continued even when an error is included in the filter coefficient information for use in motion compensation.

As described above, in this embodiment, when an error is detected by the error detecting unit 1002 and a motion vector having a sub-pixel accuracy is output by the decoding unit 1001, the motion vector is modified to have an integer accuracy. Accordingly, no is sub-pixel interpolation is required, eliminating the need of filter coefficient information for motion compensation. In this way, the motion compensation unit 1007 can perform motion compensation even when an error is included in the filter coefficient information for motion compensation.

In addition, when an error is detected by the error detecting unit 1002 and the motion vector output by the decoding unit 1001 has an integer pixel accuracy, the motion compensation unit 1007 can perform motion compensation because no filter coefficient information for motion compensation is originally used.

In this Embodiment, when an error is detected, the motion compensation unit 1007 does not use the filter coefficient information for motion compensation. However, the motion compensation unit 1007 may use an arbitrary value as the filter coefficient information for motion compensation.

Alternatively, the modifying unit 1010 may round down, round up, or round off the decimal portion of a motion vector having a sub-pixel accuracy when modifying the motion vector to have an integer accuracy. In this way, the pixel position indicated by the motion vector is modified to a nearby pixel position, which suppresses image quality degradation.

Alternatively, the modifying unit 1010 may modify a motion vector having a sub-pixel accuracy to have an arbitrary integer value when modifying the motion vector to have an integer accuracy. For example, the modifying unit 1010 may modify the motion vector into zero. In this way, the modifying unit 1010 can modify a motion vector having a sub-pixel accuracy to have an integer accuracy.

[Embodiment 2]

Figure 4:
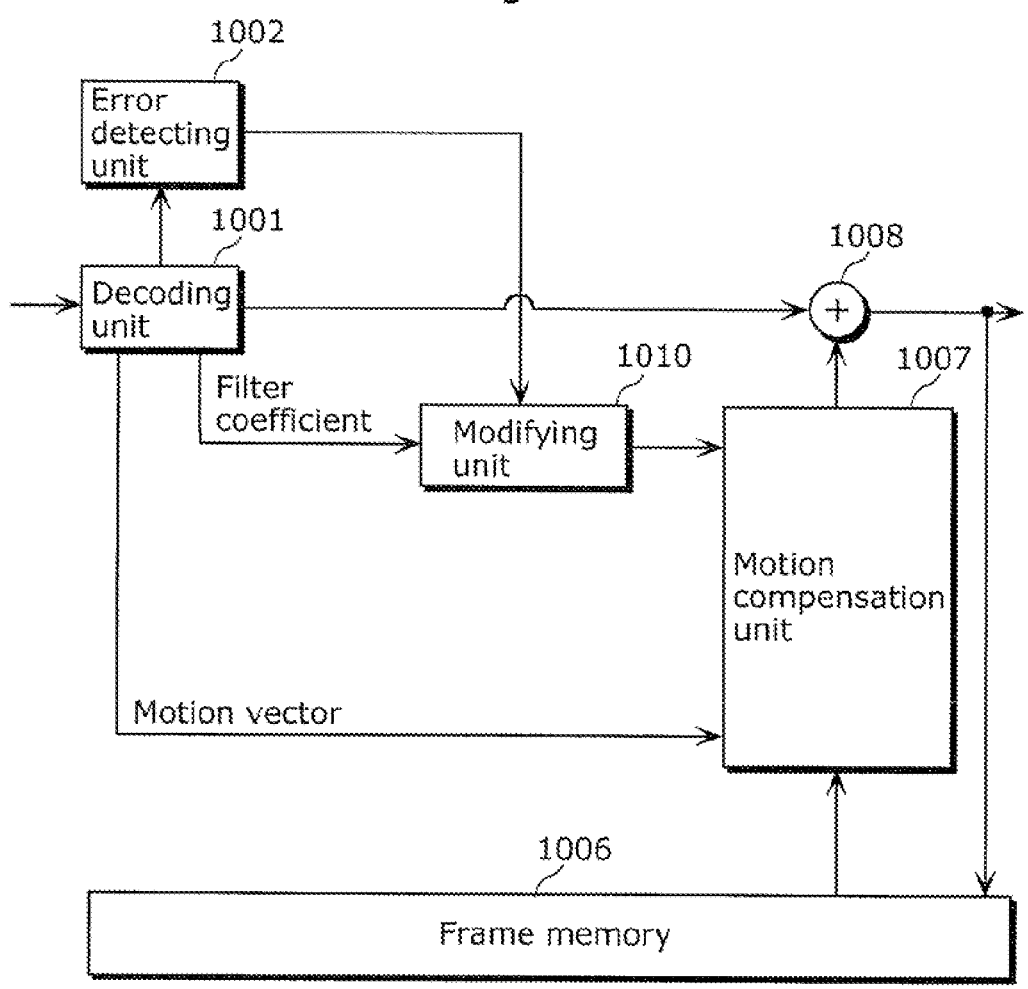
[FIG. 4]

FIG. 4 is a diagram showing a structure of a moving picture is decoding device according to Embodiment 2. In FIG. 4, each of the structural elements assigned with the same reference sign as that of a corresponding one of the structural elements in FIG. 1 has the same functions as those of the counterpart.

The moving picture decoding device shown in FIG. 4 includes a decoding unit 1001, an error detecting unit 1002, a frame memory 1006, a motion compensation unit 1007, an adder unit 1008, and a modifying unit 1010.

The modifying unit 1010 has a function of modifying filter coefficient information for use in motion compensation to have a predetermined value such as a fixed value when an error is detected by the error detecting unit 1002. In other words, the modifying unit 1010 modifies the coefficient information for use in motion compensation instead of a motion vector that is modified by the modifying unit 1010 in Embodiment 1. The pre-determined value used for the modification may be any value as long as the value is normal as the filter coefficient information for use in motion compensation.

As in Embodiment 1, the motion compensation unit 1007 has functions of obtaining a reference picture from the frame memory 1006 based on a motion vector, and performing motion compensation. However, when an error is detected by the error detecting unit 1002, the motion compensation unit 1007 performs motion compensation, using the reference picture obtained from the frame memory 1006, the modified filter coefficient information for use in motion compensation, and the decoded motion vector.

The next description is given of operations in decoding processing performed by the moving picture decoding device shown in FIG. 4.

Figure 5:
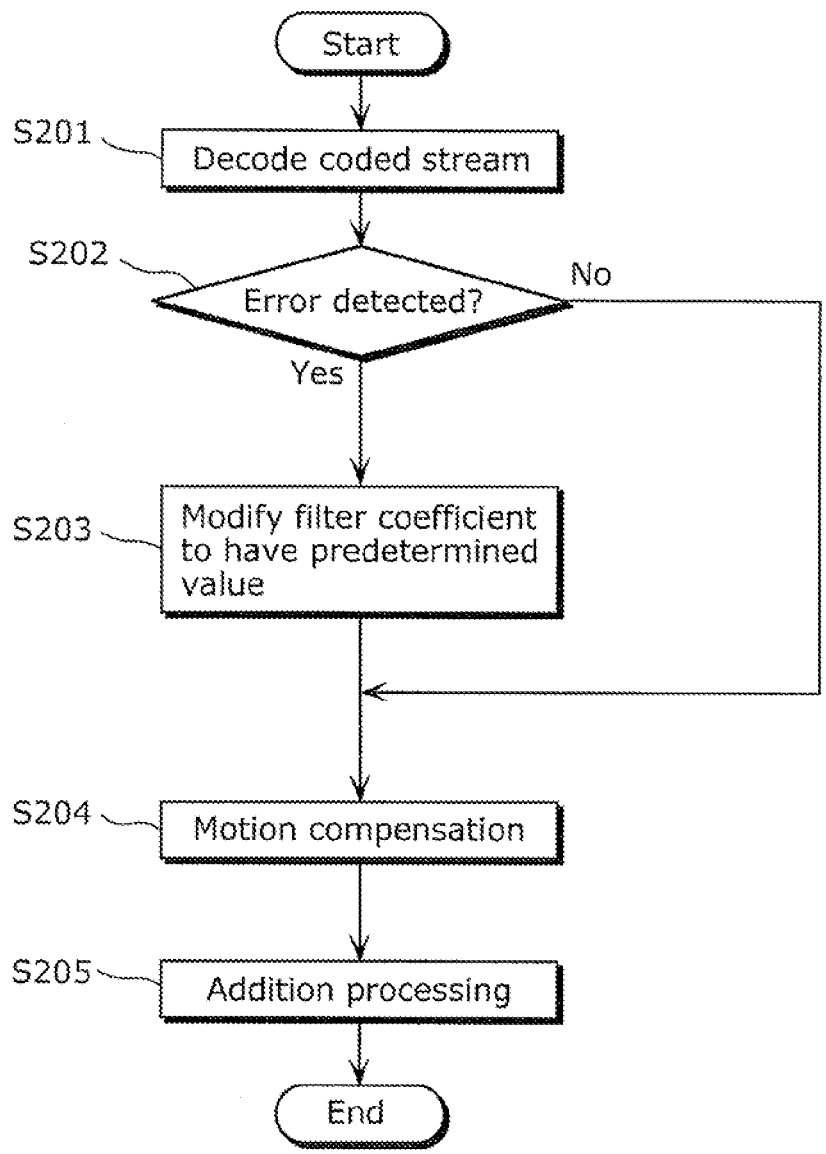
[FIG. 5]

FIG. 5 is a flowchart showing processes performed by the moving picture decoding device shown in FIG. 4.

As shown in FIG. 5, in the moving picture decoding device, the decoding unit 1001 which received a coded stream first decodes header information and a prediction error signal included in the coded stream. Next, the decoding unit 1001 outputs, as header information, the decoded filter coefficient information for use in motion compensation and the decoded motion vector information. Furthermore, the decoding unit 1001 outputs the decoded prediction error signal (S201).

When an error is included in the filter coefficient information for use in motion compensation in the coded stream, the error detecting unit 1002 detects the error (S202).

Here, when an error is detected by the error detecting unit 1002 (Yes in S202), the modifying unit 1010 modifies the filter coefficient information for use in motion compensation to have a pre-determined value such as a fixed value (S203).

On the other hand, when no error is detected by the error detecting unit 1002 (No in S202), the modifying unit 1010 does not perform any modification (S203).

The motion compensation unit 1007 obtains a reference picture for use in motion compensation from the frame memory 1006, and performs motion compensation by identifying the pixel value at the pixel position indicated by the motion vector (5204).

Here, as in Embodiment 1, the motion compensation unit 1007 performs motion compensation when no error is detected by the error detecting unit 1002.

On the other hand, when an error is detected by the error detecting unit 1002, the motion compensation unit 1007 performs motion compensation by identifying the pixel value at the pixel position indicated by the decoded motion vector, based on the modified filter coefficient information for use in motion compensation. Since the filter coefficient information for use in motion compensation has been modified into normal filter coefficient for use in motion compensation at the time of motion compensation, the motion compensation unit 1007 can identify the pixel value at a sub-pixel position.

Accordingly, the motion compensation unit 1007 can perform motion compensation even when the motion vector indicates a sub-pixel position.

Next, the motion compensation unit 1007 performs motion compensation so as to generate a prediction picture. Furthermore, the motion compensation unit 1007 outputs the generated prediction picture to the adder unit 1008.

Next, the adder unit 1008 adds the prediction picture output by the motion compensation unit 1007 and the prediction error signal output by the decoding unit 1001 so as to generate a picture (S205). Next, the adder unit 1008 outputs the generated picture.

Figure 6:
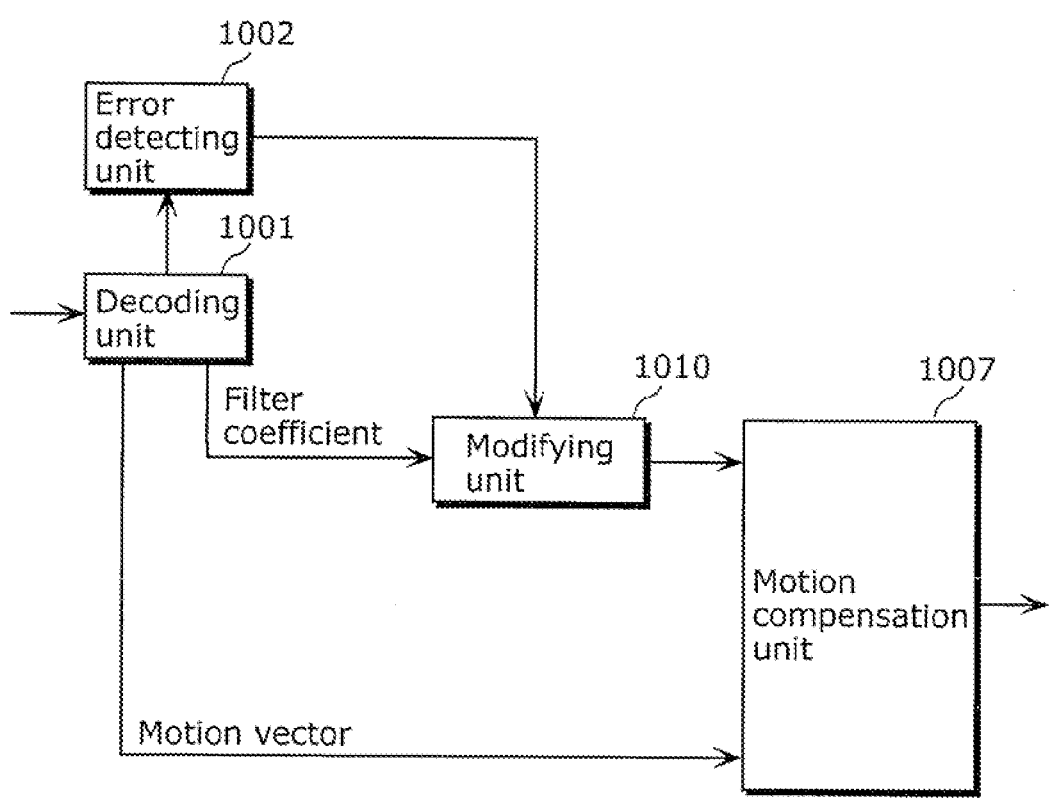
[FIG. 6]

FIG. 6 is a diagram showing a unique structure of the moving picture decoding device shown in FIG. 4. The moving picture decoding device shown in FIG. 6 includes a decoding unit 1001, an error detecting unit 1002, a motion compensation unit 1007, and a modifying unit 1010. Each of the structural elements shown in FIG. 6 has the same function as that of the corresponding one of the structural elements shown in FIG. 4.

The moving picture decoding device shown in FIG. 6 does not include a frame memory 1006 and an adder unit 1008. For example, these structural elements may be outside the moving picture decoding device. The motion compensation unit 1007 may obtain a reference picture from an external memory, and output a prediction picture to an external adder. The external adder adds the prediction error signal decoded by the decoding unit 1001 and the prediction picture generated by the motion compensation unit so as to generate a picture.

With the structure shown in FIG. 6, the motion compensation does not stop even when an error is included in filter coefficient information for use in motion compensation. Accordingly, the motion compensation is continued even when an error is included in filter coefficient information for use in motion compensation.

According to this embodiment, when an error is detected by the error detecting unit 1002, the filter coefficient information for use in motion compensation is modified into a predetermined value such as a fixed value. Accordingly, the motion compensation unit 1007 can perform motion compensation even when an error is included in the filter coefficient information for use in motion compensation.

It is to be noted that, in this embodiment, when an error is detected, the modifying unit 1010 modifies the filter coefficient information for use in motion compensation into a pre-determined value. However, the modifying unit 1010 may modify a filter coefficient to an arbitrary value that enables identification of the pixel value at a sub-pixel position indicated by a decoded motion vector.

In addition, the modifying unit 1010 may modify filter coefficient for use in motion compensation into a default value pre-defined according to a video compression technique, or into filter coefficient for use in motion compensation having a valid value to be multiplied by the pixel value at a nearby pixel position indicated by the motion vector.

For example, the modifying unit 1010 may modify the filter coefficient such that the pixel value at the sub-pixel position indicated by the motion vector corresponds to the average value of plural pixel values at the plural integer pixel positions that surround the sub-pixel position. In this way, the pixel value at the pixel position near the sub-pixel position indicated by the motion vector is used, which suppresses image quality degradation.

In addition, the modifying unit 1010 may execute modification only when a motion vector has a sub-pixel accuracy as in Embodiment 1.

[Embodiment 3]

Figure 7:
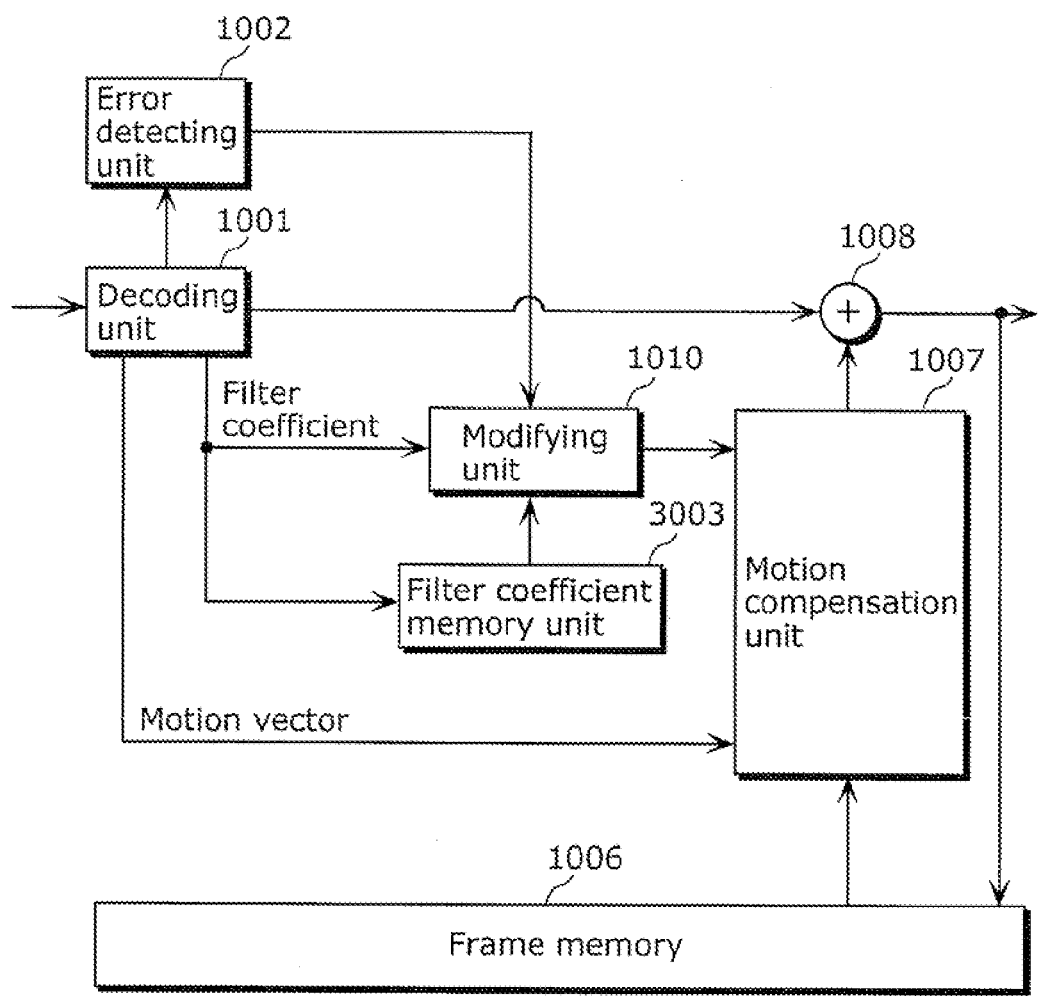
[FIG. 7]

FIG. 7 is a diagram showing a structure of a moving picture decoding device according to Embodiment 3. In FIG. 7, each of the structural elements assigned with the same reference sign as that of a corresponding one of the structural elements in FIG. 4 has the same functions as those of the counterpart.

The moving picture decoding device shown in FIG. 7 includes a decoding unit 1001, an error detecting unit 1002, a frame memory 1006, a motion compensation unit 1007, an adder unit 1008, and a modifying unit 1010.

The filter coefficient memory unit 3003 has a function of storing previously decoded filter information for use in motion compensation. For example, the decoding unit 1001 stores, in a filter coefficient memory unit 3003, error-free filter coefficient information for use in motion compensation. In this way, one or more pieces of filter coefficient information for use in motion compensation are stored in the filter coefficient memory unit 3003.

As in Embodiment 2, the modifying unit 1010 has a function of modifying current filter coefficient information for use in motion compensation. When an error is detected by the error detecting unit 1002, the modifying unit 1010 in Embodiment 3 reads out other filter coefficient information for use in motion compensation stored in the filter coefficient memory unit 3003. Next, the modifying unit 1010 modifies the current filter coefficient information for use in motion compensation into the read out filter coefficient information for use in motion compensation.

The next description is given of operations in decoding processing performed by the moving picture decoding device shown in FIG. 7.

Figure 8:
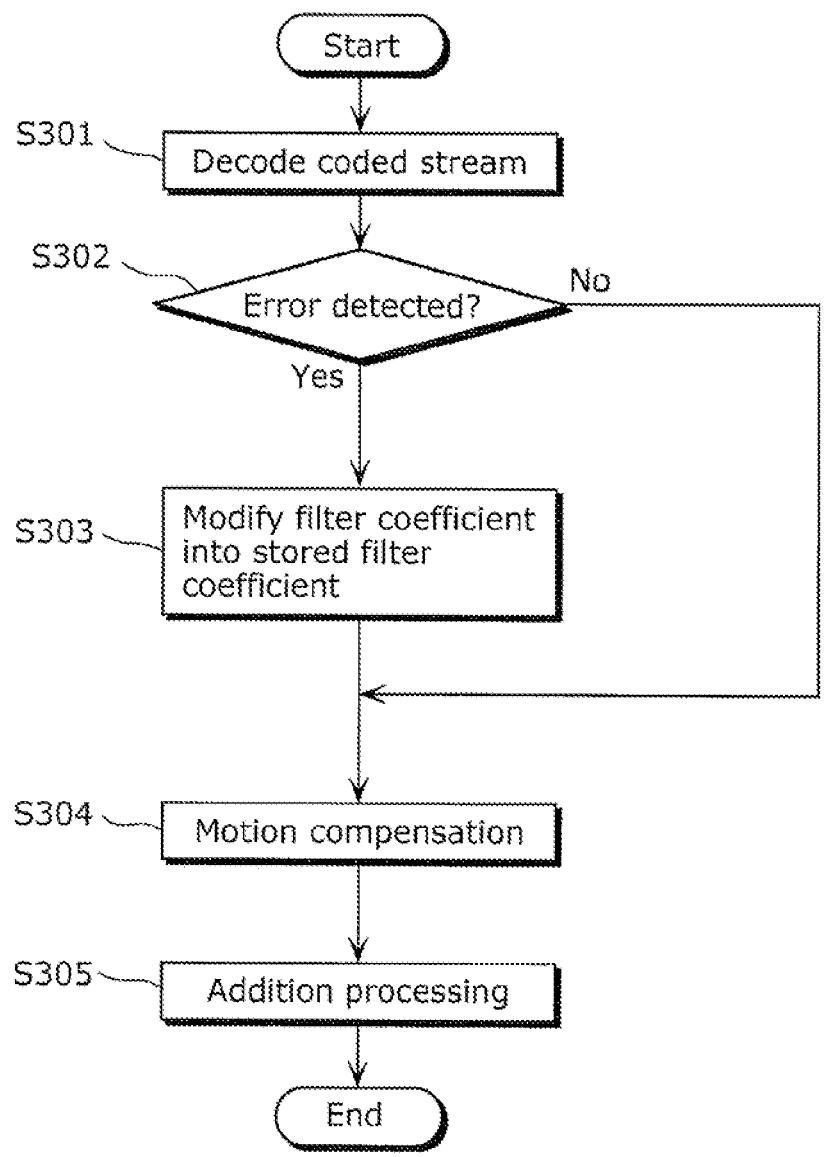
[FIG. 8]

FIG. 8 is a flowchart showing processes performed by the moving picture decoding device shown in FIG. 7.

As shown in FIG. 8, in the moving picture decoding device, the decoding unit 1001 which received a coded stream first decodes header information and a prediction error signal included in the coded stream. Next, the decoding unit 1001 outputs the filter coefficient information for use in motion compensation and motion vector information decoded as the header information. Furthermore, the decoding unit 1001 outputs the decoded prediction error signal (S301).

When an error is included in the filter coefficient information for use in motion compensation in the coded stream, the error detecting unit 1002 detects the error (S302).

Here, when an error is detected by the error detecting unit 1002 (Yes in S302), the modifying unit 1010 reads out, from the filter coefficient memory unit 3003, previously decoded filter coefficient information for motion compensation. Next, the modifying unit 1010 modifies the current filter coefficient information for motion compensation into the read out filter coefficient information for use in motion compensation (S303).

On the other hand, when no error is detected by the error detecting unit 1002 (No in S302), the modifying unit 1010 does not perform any modification (S303).

Next, the motion compensation unit 1007 obtains a reference picture for use in motion compensation from the frame memory 1006, and performs motion compensation by identifying the pixel value at the pixel position indicated by the motion vector (S304). Here, the motion compensation unit 1007 can perform motion compensation by operating as in Embodiment 2 (S204).

Next, the motion compensation unit 1007 performs motion compensation so as to generate a prediction picture. Furthermore, the motion compensation unit 1007 outputs the generated prediction picture to the adder unit 1008.

Next, the adder unit 1008 adds the prediction picture output by the motion compensation unit 1007 and the prediction error signal output by the decoding unit 1001 so as to generate a picture (S305). Next, the adder unit 1008 outputs the generated picture.

Figure 9:
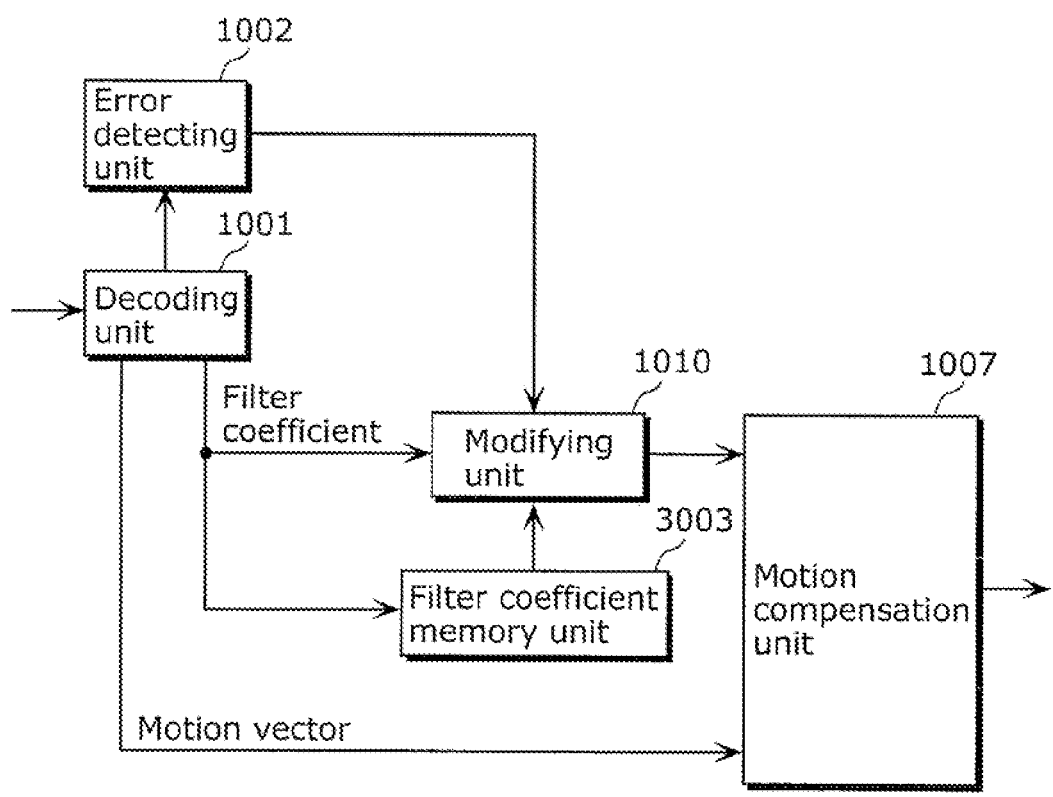
[FIG. 9]

FIG. 9 is a diagram showing a unique structure of the moving picture decoding device shown in FIG. 7. The moving picture decoding device shown in FIG. 9 includes a decoding unit 1001, an error detecting unit 1002, a motion compensation unit 1007, a modifying unit 1010, and a filter coefficient memory unit 3003. Each of the structural elements shown in FIG. 6 has the same functions as those of the corresponding one of the structural elements shown in FIG. 7.

The moving picture decoding device shown in FIG. 9 does not include a frame memory 1006 and an adder unit 1008. For example, these structural elements may be outside the moving picture decoding device. The motion compensation unit 1007 may obtain a reference picture from an external memory, and output a prediction picture to an external adder. The external adder adds the prediction error signal decoded by the decoding unit 1001 and the prediction picture generated by the motion compensation unit so as to generate a picture.

With the structure shown in FIG. 9, the motion compensation does not stop even when an error is included in filter coefficient information for use in motion compensation. Accordingly, the motion compensation is continued even when an error is included in the filter coefficient information for use in motion compensation.

As described above, in this embodiment, when an error is detected by the error detecting unit 1002, current filter coefficient information for motion compensation is modified to filter coefficient information for motion compensation that has been correctly decoded. Accordingly, the motion compensation unit 1007 can perform motion compensation even when an error is included in the filter coefficient information for motion compensation.

In this embodiment, when an error is detected, the modifying unit 1010 modifies current filter information for motion compensation using filter coefficient information for motion compensation that has been correctly decoded. Here, the modifying unit 1010 may modify current filter information for motion compensation into filter coefficient information for motion compensation that has been decoded lastly. In other words, the modifying unit 1010 may modify current filter information for motion compensation into filter coefficient information that is closest in decoding order to the current picture to be decoded and thus is suitable for use in motion compensation. In this way, implementation of the present invention is simplified.

In addition, the modifying unit 1010 may modify current filter information for motion compensation into filter coefficient information that is closest in display order to the current picture to be decoded and thus is suitable for use in motion compensation. In this way, the filter coefficient information is modified into filter coefficient information for motion compensation having characteristics similar to those of the current picture to be decoded and thus is suitable for use in motion compensation. Accordingly, image quality degradation is suppressed.

Alternatively, the modifying unit 1010 may modify current filter coefficient for motion compensation into filter coefficient information at the spatially closest position and thus is suitable for use in motion compensation. For example, when filter coefficient information for use in motion compensation is determined in units of a block, plural pieces of the filter coefficient information for use in motion compensation at spatially close positions are considered to have a similar value. Accordingly, since the filter coefficient information for motion compensation is modified into filter coefficient information suitable for use in motion compensation that is at the spatially close position, image quality degradation is suppressed.

Alternatively, the modifying unit 1010 may modify current filter coefficient for motion compensation into filter coefficient information suitable for use in motion compensation that is at the temporally closest position. For example, when filter coefficient information for motion compensation is determined in units of a field, the modifying unit 1010 may use the filter coefficient information for motion compensation in another field in the same picture. The modifying unit 1010 may use the filter coefficient information for use in motion compensation that is closest in decoding order, as the filter coefficient information suitable for use in motion compensation that is at the temporally closest position.

Furthermore, the filter coefficient memory unit 3003 may store, in advance, filter coefficient information for use in motion compensation. In this case, the filter coefficient information for use in motion compensation stored in the filter coefficient memory unit 3003 may not be filter coefficient information for motion compensation previously decoded.

[Embodiment 4]

Figure 10:
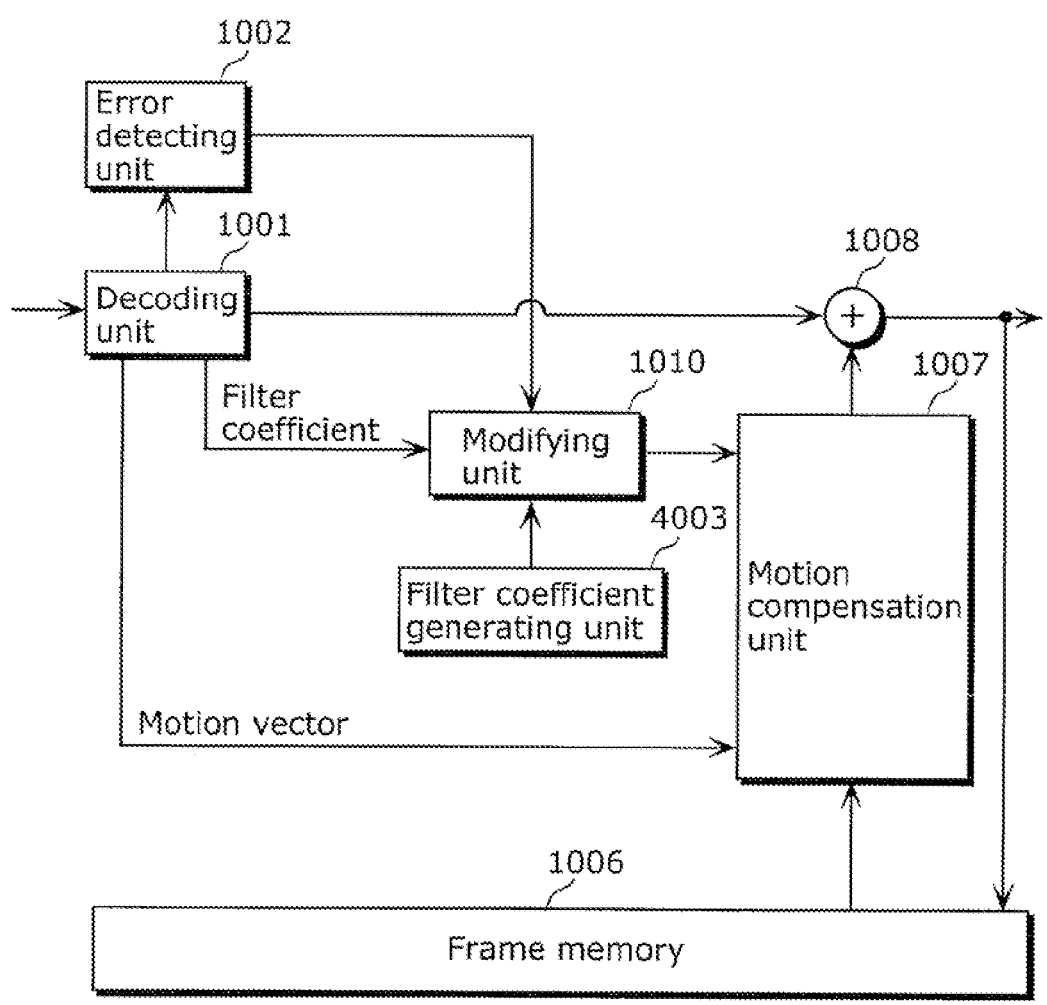
[FIG. 10]

FIG. 10 is a diagram showing a structure of a moving picture decoding device according to Embodiment 4. In FIG. 10, each of the structural elements assigned with the same reference sign as that of a corresponding one of the structural elements in FIG. 4 has the same functions as those of the counterpart.

The moving picture decoding device shown in FIG. 10 includes a decoding unit 1001, an error detecting unit 1002, a frame memory 1006, a motion compensation unit 1007, an adder unit 1008, a modifying unit 1010, and a filter coefficient generating unit 4003.

The filter coefficient generating unit 4003 has a function of generating new motion compensation filter coefficient information for identifying the pixel value at the sub-pixel position indicated by a motion vector.

As in Embodiment 2, the modifying unit 1010 has a function of modifying filter coefficient information for motion compensation. When an error is detected by the error detecting unit 1002, the modifying unit 1010 in Embodiment 4 modifies the filter coefficient information for motion compensation into new filter coefficient information that is suitable for use in motion compensation generated by the filter coefficient generating unit 4003.

The next description is given of operations in decoding processing performed by the moving picture decoding device shown in FIG. 10.

Figure 11:
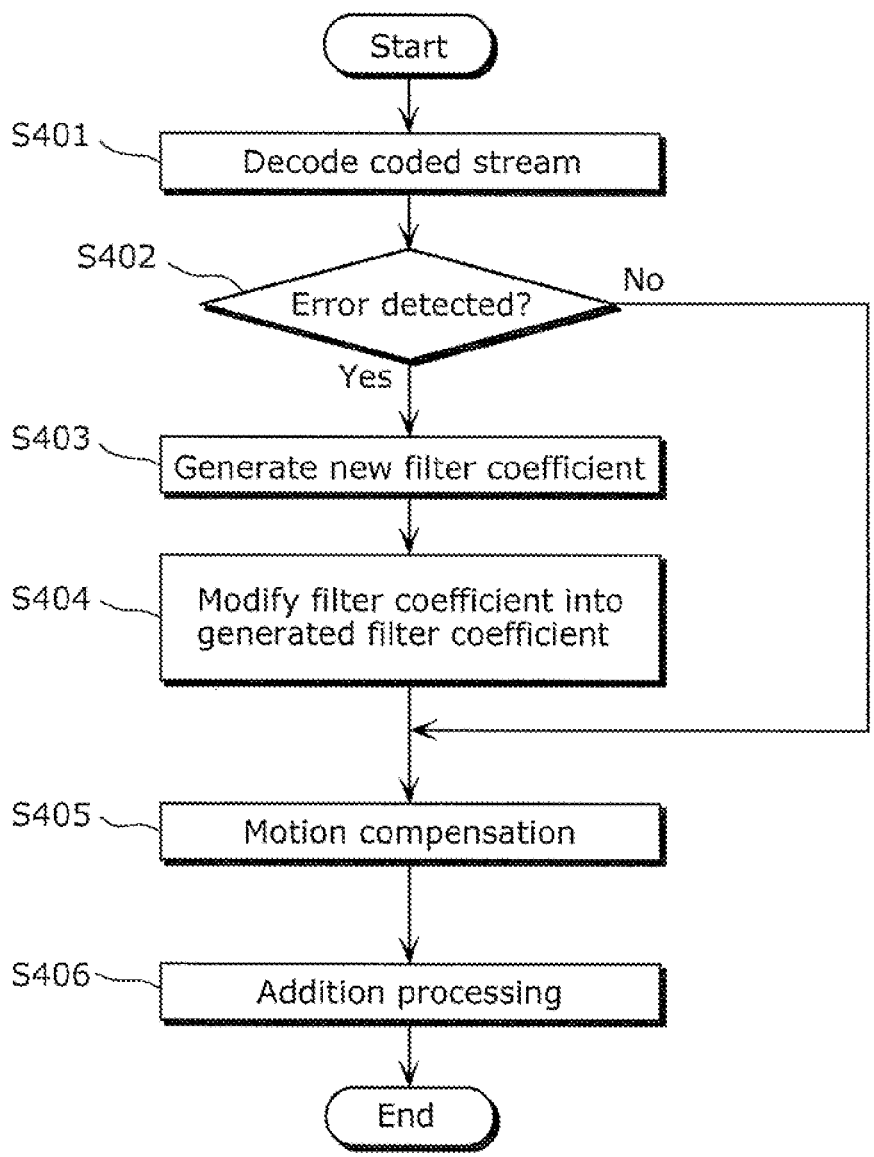
[FIG. 11]

FIG. 11 is a flowchart showing processes performed by the moving picture decoding device shown in FIG. 10.

As shown in FIG. 11, in the moving picture decoding device, the decoding unit 1001 which received a coded stream first decodes header information and a prediction error signal included in the coded stream. Next, the decoding unit 1001 outputs, as header information, the decoded filter coefficient information for use in motion compensation and the decoded motion vector information. Furthermore, the decoding unit 1001 outputs the prediction error signal (S401).

When an error is included in the filter coefficient information for use in motion compensation in the coded stream, the error detecting unit 1002 detects the error (S402).

When no error is detected by the error detecting unit 1002 (Yes in S402), the filter coefficient generating unit 4003 generates new filter coefficient information suitable for use in motion compensation (S403). The filter coefficient generating unit 4003 may generate in advance new filter coefficient information suitable for use in motion compensation, irrespective of presence or absence of an error.

Next, the modifying unit 1010 modifies the current filter coefficient information for motion compensation into the newly generated filter coefficient information suitable for use in motion compensation (S404).

On the other hand, when no error is detected by the error detecting unit 1002 (No in S402), the modifying unit 1010 does not perform any modification (S404).

The motion compensation unit 1007 obtains a reference picture for use in motion compensation from the frame memory 1006, and performs motion compensation by identifying the pixel value at the pixel position indicated by the motion vector (S405). Here, the motion compensation unit 1007 can perform motion compensation by operating as in Embodiment 2 (S204).

Next, the motion compensation unit 1007 performs motion compensation so as to generate a prediction picture. Furthermore, the motion compensation unit 1007 outputs the generated prediction picture to the adder unit 1008.

The adder unit 1008 adds the prediction picture output by the motion compensation unit 1007 and the prediction error signal output by the decoding unit 1001 so as to generate a picture (S4,06). Next, the adder unit 1008 outputs the generated picture.

Figure 12:
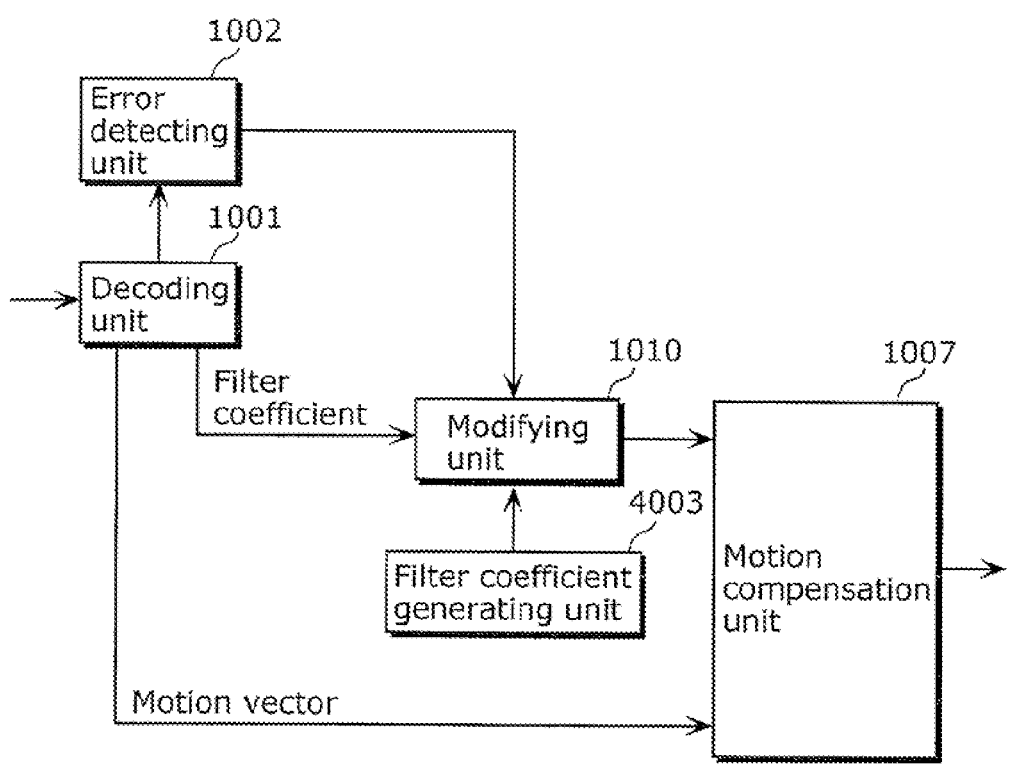
[FIG. 12]

FIG. 12 is a diagram showing a unique structure of the moving picture decoding device shown in FIG. 10. The moving picture decoding device shown in FIG. 12 includes a decoding unit 1001, an error detecting unit 1002, a motion compensation unit 1007, a modifying unit 1010, and a filter coefficient generating unit 4003. Each of the structural elements shown in FIG. 12 has the same functions as those of the corresponding one of the structural elements shown in FIG. 10.

The moving picture decoding device shown in FIG. 12 does not include a frame memory 1006 and an adder unit 1008. For example, these structural elements may be outside the moving picture decoding device. The motion compensation unit 1007 may obtain a reference picture from an external memory, and output a prediction picture to an external adder. The external adder adds the prediction error signal decoded by the decoding unit 1001 and the prediction picture generated by the motion compensation unit so as to generate a picture.

With the structure shown in FIG. 12, the motion compensation in does not stop even when an error is included in filter coefficient information for use in motion compensation. Accordingly, the motion compensation is continued even when an error is included in filter coefficient information for use in motion compensation.

According to this embodiment, new filter coefficient information suitable for use in motion compensation is generated when an error is detected by the error detecting unit 1002. Accordingly, the motion compensation unit 1007 can perform motion compensation even when an error is included in the filter coefficient information for motion compensation.

It is to be noted that, in this embodiment, the filter coefficient generating unit 4003 generates new filter coefficient information suitable for use in motion compensation to identify the pixel value at the sub-pixel position indicated by a motion vector. The filter coefficient generating unit 4003 may generate filter coefficient information for use in motion compensation according to or without according to a method defined in a video compression standard. For example, the new filter coefficient information suitable for use in motion compensation may have a format conforming to or not conforming to a method defined in a video compression standard.

In addition, the filter coefficient generating unit 4003 may generate new filter coefficient information suitable for use in motion compensation within a predetermined range. In this way, the filter coefficient generating unit 4003 can prevent an abnormal value from being generated as the new filter coefficient information suitable for use in motion compensation.

In addition, the filter coefficient generating unit 4003 may generate new filter coefficient information for use in motion compensation such that the pixel value at the sub-pixel position indicated by the motion vector falls within a predetermined range. In this way, the filter coefficient generating unit 4003 can prevent generation of filter coefficient information for use in motion compensation that yields an abnormal value as the pixel value at a sub-pixel position.

Alternatively, the filter coefficient generating unit 4003 may generate new filter coefficient information suitable for use in motion compensation according to the same filter coefficient generating method as the method used in coding. In this way, the same motion compensation filter coefficient information as in coding is used in decoding. Accordingly, image quality degradation is suppressed.

Alternatively, the filter coefficient generating unit 4003 may generate new filter coefficient information suitable for use in motion compensation, by pre-reading a coded stream up to a portion at which the error is stopped and decoding the filter coefficient information for use in motion compensation. In this way, the error-free filter coefficient information suitable for use in motion compensation is used in motion compensation.

[Embodiment 5]

Figure 13:
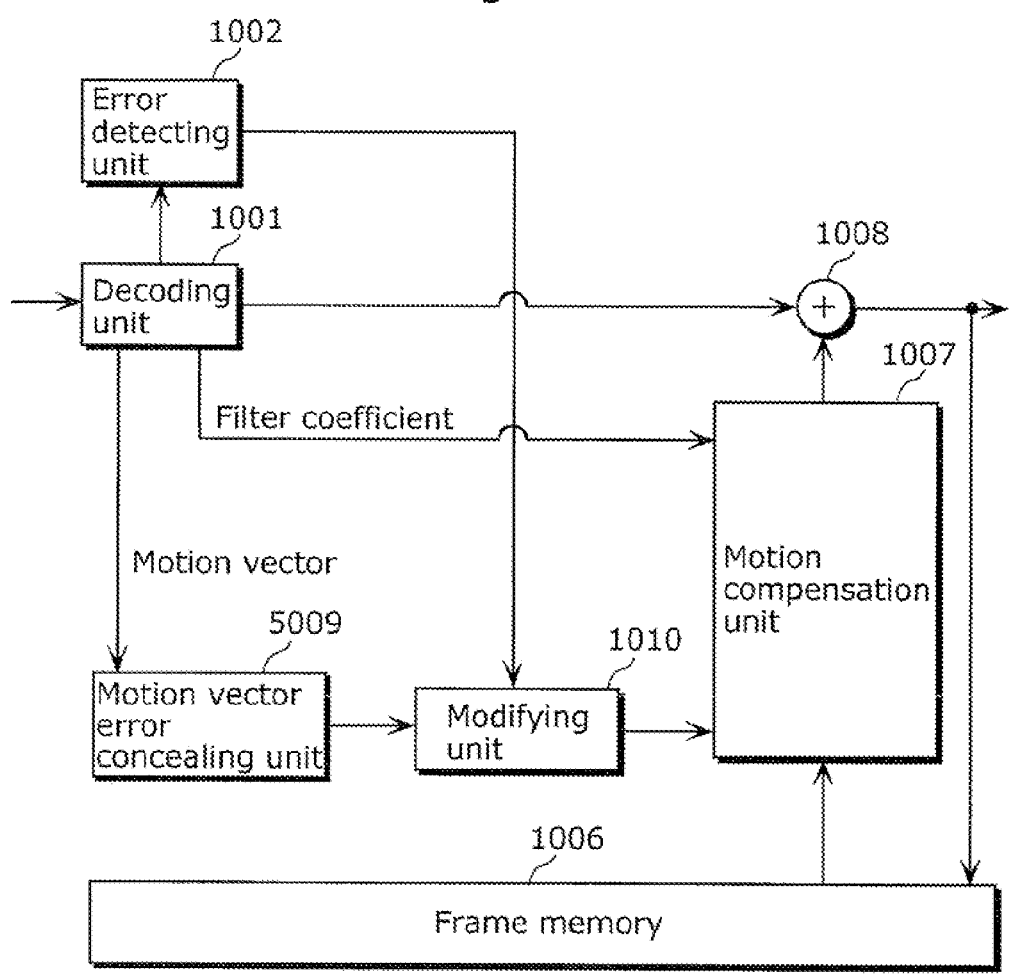
[FIG. 13]

FIG. 13 is a diagram showing a structure of a moving picture decoding device according to Embodiment 5. In FIG. 13, each of the structural elements assigned with the same reference sign as that of a corresponding one of the structural elements in FIG. 1 has the same functions as those of the counterpart.

The moving picture decoding device shown in FIG. 13 includes a decoding unit 1001, an error detecting unit 1002, a frame memory 1006, a motion compensation unit 1007, an adder unit 1008, a modifying unit 1010, and a motion vector error concealing unit 5009.

The error detecting unit 1002 has a function of detecting an error, when a coded stream does not conform to the standardized standard of the video compression technique. The error detecting to unit 1002 in Embodiment 5 detects an error in a motion vector, in addition to an error in filter coefficient information for motion compensation.

The motion vector error concealing unit 5009 has a function of concealing an error in a motion vector according to the same method as in the conventional art, when an error is detected by the error detecting unit 1002.

The modifying unit 1010 has a function of modifying a motion vector into a motion vector having an integer accuracy. The modifying unit 1010 in Embodiment 5 modifies the motion vector generated by the motion vector error concealing unit 5009 into a motion vector having an integer accuracy.

The next description is given of operations in decoding processing performed by the moving picture decoding device shown in FIG. 13.

Figure 14:
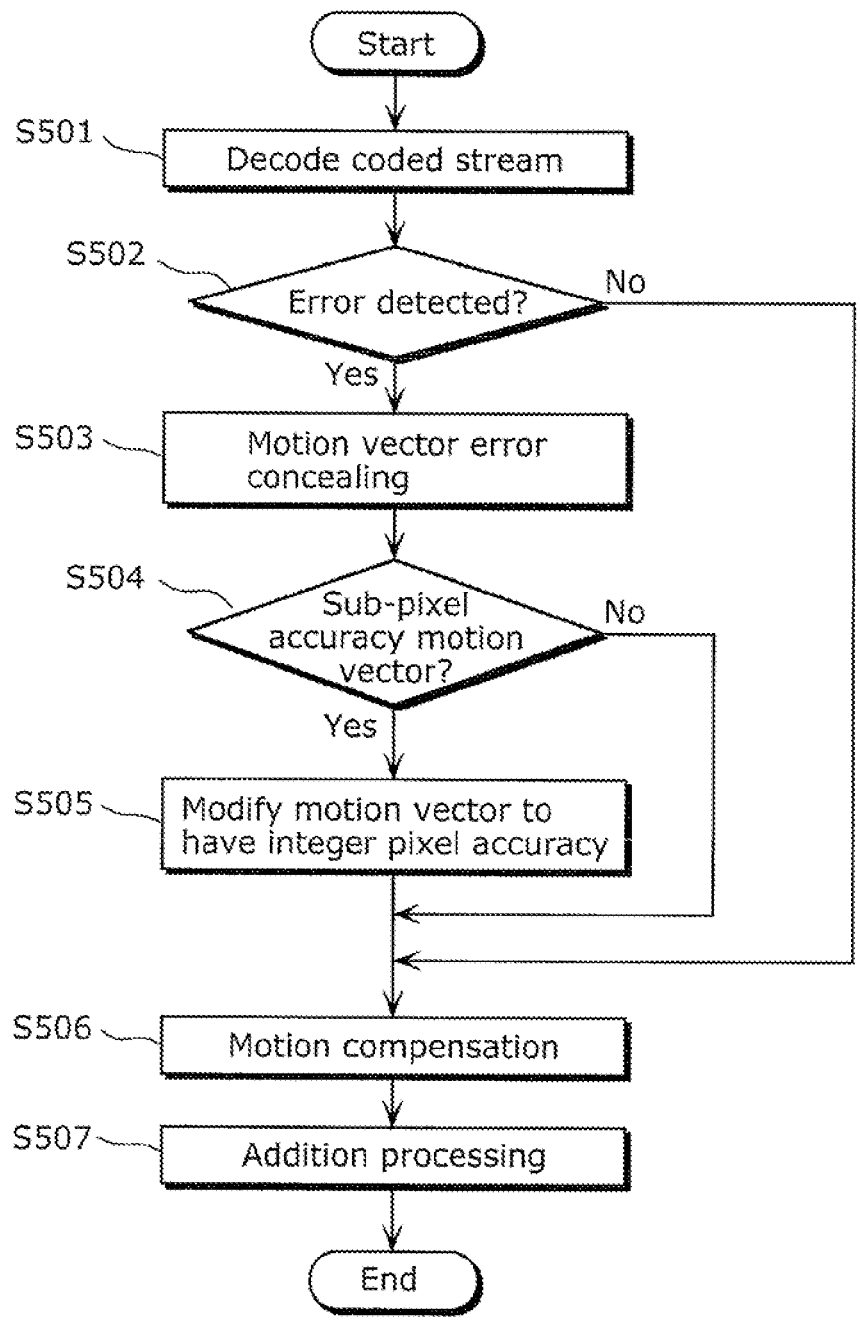
[FIG. 14]

FIG. 14 is a flowchart showing processes performed by the moving picture decoding device shown in FIG. 13.

As shown in FIG. 14, in the moving picture decoding device, the decoding unit 1001 which received a coded stream first decodes header information and a prediction error signal included in the coded stream. Next, the decoding unit 1001 outputs, as header information, the decoded filter coefficient information for use in motion compensation and the decoded motion vector information. Furthermore, the decoding unit 1001 outputs the decoded prediction error signal (S501).

When an error is included in the coded stream, the error detecting unit 1002 detects the error (S502).

When the error is detected by the error detecting unit 1002 (Yes in S502), the motion vector error concealing unit 5009 generates a motion vector for use in error concealment according to the method disclosed in PTL 1 (S503).

The modifying unit 1010 determines whether or not the motion vector information generated by the motion vector error concealing unit 5009 is a motion vector having an integer accuracy or a motion vector having a sub-pixel accuracy (S504). When the motion vector is found to have a sub-pixel accuracy as a result of the determination (Yes in S504), the modifying unit 1010 modifies the motion vector into a motion vector having an integer accuracy (S505). When no error is detected (No in S502), or when a motion vector having an integer accuracy is detected when an error is detected (No in S504), the motion vector information generated by the motion vector error concealing unit 5009 is output to the motion compensation unit 1007 without any modification.

The motion compensation unit 1007 obtains a reference picture for use in motion compensation from the frame memory 1006, and performs motion compensation by identifying the pixel value at the pixel position indicated by the motion vector (S506). Here, the motion compensation unit 1007 can perform motion compensation by operating as in Embodiment 1 (S105).

Here, when an error is detected by the error detecting unit 1002 and when the motion vector generated by the motion vector error concealing unit 5009 has an integer accuracy, motion compensation is performed using the motion vector generated by the motion vector error concealing unit 5009.

Next, the motion compensation unit 1007 performs motion compensation so as to generate a prediction picture. Furthermore, the motion compensation unit 1007 outputs the generated prediction picture to the adder unit 1008.

The adder unit 1008 adds the prediction picture output by the motion compensation unit 1007 and the prediction error signal output by the decoding unit 1001 so as to generate a picture (S507). Next, the adder unit 1008 outputs the generated picture.

As described above, in this embodiment, when an error is detected by the error detecting unit 1002 and a motion vector having a sub-pixel accuracy is output by the motion vector error concealing unit 5009, the motion vector is modified to have an integer accuracy. Accordingly, sub-pixel interpolation and filter coefficient information for motion compensation are not required. In this way, the motion compensation unit 1007 can perform motion compensation even when an error is included in the filter coefficient information for motion compensation.

In addition, when an error is detected by the error detecting unit 1002 and the motion vector output by the motion vector error concealing unit 5009 has an integer pixel accuracy, the motion compensation unit 1007 can perform motion compensation because no filter coefficient information for motion compensation is originally used.

This embodiment shows an example in which the modification is combined with the error concealment in PTL 1. However, the modification may be combined with the error concealment in PTL 2 or other conventional art.

This embodiment shows an example in which some of the structural elements of Embodiment 1 are combined with some of the structural elements of the conventional art. However, some of the structural elements of either Embodiment 2, Embodiment 3, or Embodiment 4 may be combined with some of the structural elements of the conventional art.

[Embodiment 6]

A moving picture decoding device according to Embodiment 6 includes, as main structural elements, the same structural elements as the structural elements shown in the above-described plural embodiments.

Figure 15:
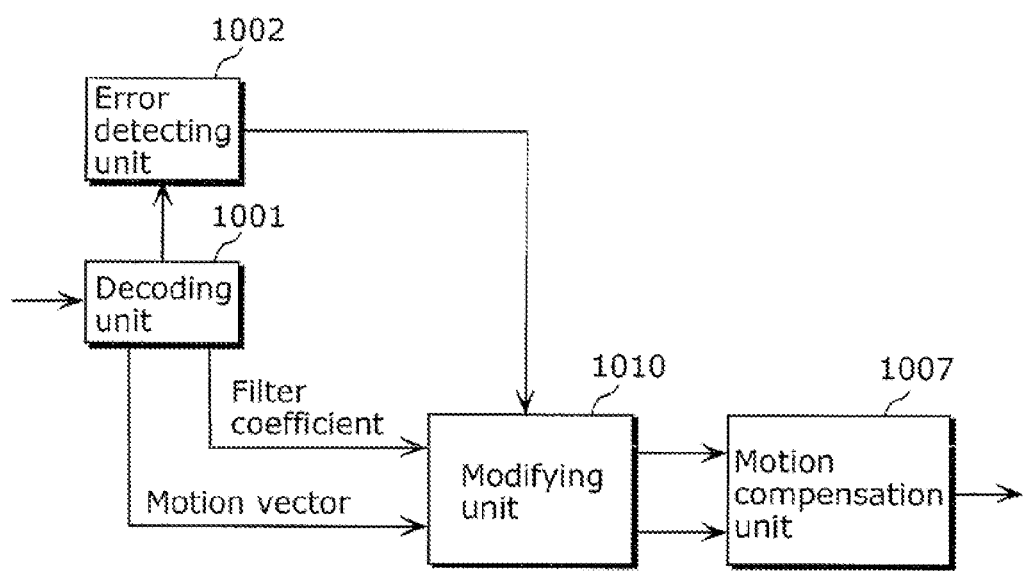
[FIG. 15]

FIG. 15 is a diagram showing a structure of a moving picture decoding device according to Embodiment 6.

The moving picture decoding device shown in FIG. 15 includes a decoding unit 1001, an error detecting unit 1002, a motion compensation unit 1007, and a modifying unit 1010.

The decoding unit 1001 decodes a motion vector indicating a sub-pixel position and a filter coefficient for identifying a pixel value of the sub-pixel position. The motion vector and the filter coefficient are included in a coded stream.

The error detecting unit 1002 detects an error in a filter coefficient.

The modifying unit 1010 modifies either the motion vector or the filter coefficient so as to enable the identification of the pixel value at the pixel position for use in motion compensation, when the error is detected. The modifying unit 1010 in Embodiment 6 may be implemented as the modifying unit 1010 shown in Embodiment 1, Embodiment 2, or the like.

The motion compensation unit 1007 performs motion compensation by identifying the pixel value at the pixel position using the modified one of the motion vector and the filter coefficient, when the error is detected.

Figure 16:
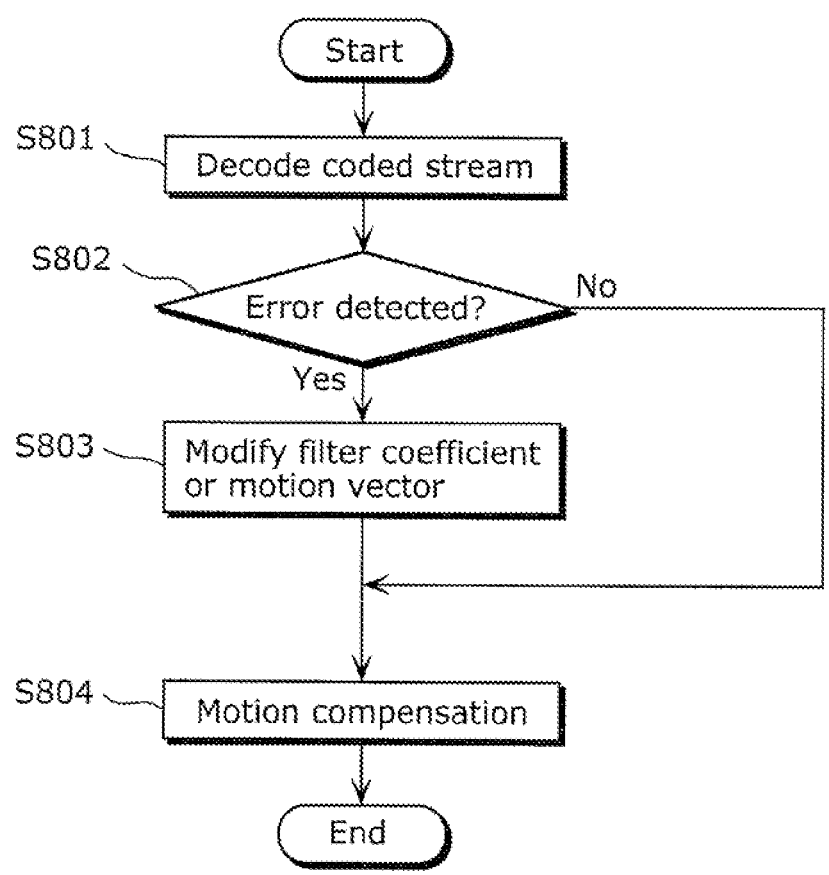
[FIG. 16]

FIG. 16 is a flowchart indicating processes performed by a moving picture decoding device according to Embodiment 6.

First, the decoding unit 1001 decodes a motion vector indicating a sub-pixel position and a filter coefficient for identifying the pixel value at a sub-pixel position (S801). The motion vector and the filter coefficient are included in a coded stream.

Next, the error detecting unit 1002 detects an error in a filter coefficient (S802).

Here, when an error is detected by the error detecting unit (Yes in S802), the modifying unit 1010 modifies either the motion vector or the filter coefficient so as to enable the identification of the pixel value at the pixel position for use in motion compensation (S803).

Next, the motion compensation unit 1007 performs motion compensation (S804). The motion compensation unit 1007 performs motion compensation by identifying the pixel value at the pixel position using the modified one of the motion vector and the filter coefficient, when the error is detected.

In this way, the moving picture decoding device according to the present invention can continue the motion compensation even when an error is included in a filter coefficient for use in motion compensation.

[Embodiment 7]

Figure 17:
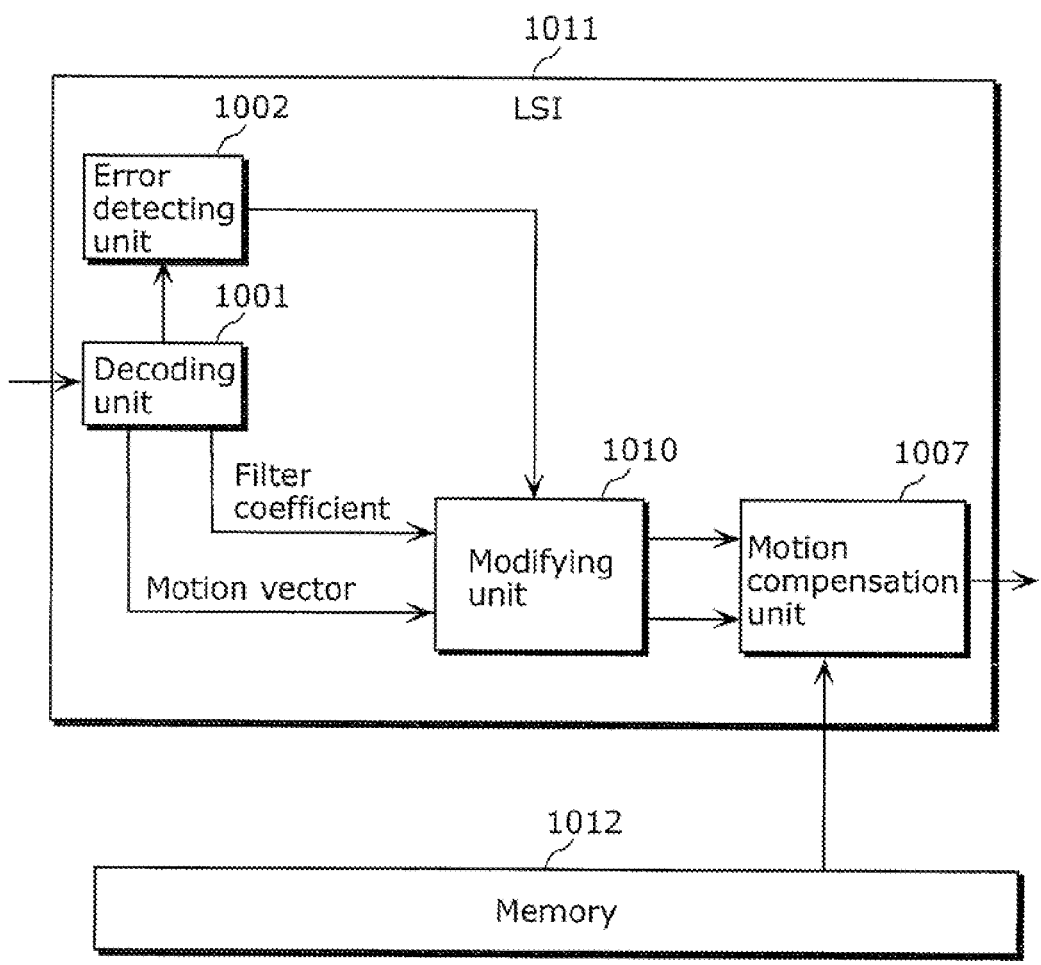
[FIG. 17]

FIG. 17 is a diagram showing a unique structure of a moving picture decoding device according to Embodiment 7.

The moving picture decoding system shown in FIG. 17 includes an LSI (Large Scale Integration) 1011 which performs motion compensation, and a memory 1012 which stores reference pictures. The LSI 1011 is an integrated circuit that includes a decoding unit 1001, an error detecting unit 1002, a motion compensation unit 1007, and a modifying unit 1010.

The decoding unit 1001 decodes a motion vector indicating a sub-pixel position and a filter coefficient for identifying a pixel value at the sub-pixel position. The motion vector and the filter coefficient are included in a coded stream.

The error detecting unit 1002 detects an error in a filter coefficient.

The modifying unit 1010 modifies either the motion vector or the filter coefficient so as to enable the identification of the pixel value at the pixel position for use in motion compensation, when the error is detected.

The motion compensation unit 1007 performs motion compensation by identifying the pixel value at the pixel position in a reference picture stored in the memory 1012, using the modified one of the motion vector and the filter coefficient, when the error is detected.

In this way, the moving picture decoding device according to this embodiment can continue the motion compensation even when the error is included in the filter coefficient for use in motion compensation.

Although the above memory 1012 is described as a device outside the LSI 1011, the memory 1012 may be configured inside the LSI 1011. All of the elements of LSI 1011 may be integrated into a single chip or each of the elements may be configured as a chip.

The name used here is LSI, but it may also be called IC, system LSI, super LSI, or ultra LSI depending on the degree of integration.

Moreover, ways to achieve integration are not limited to the LSI, to and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate such functional blocks. Application of biotechnology is one such possibility.

[Embodiment 8]

A moving picture coding and decoding system is described as an application example of the moving picture decoding device according to any one of Embodiments 1 to 6.

Figure 18:
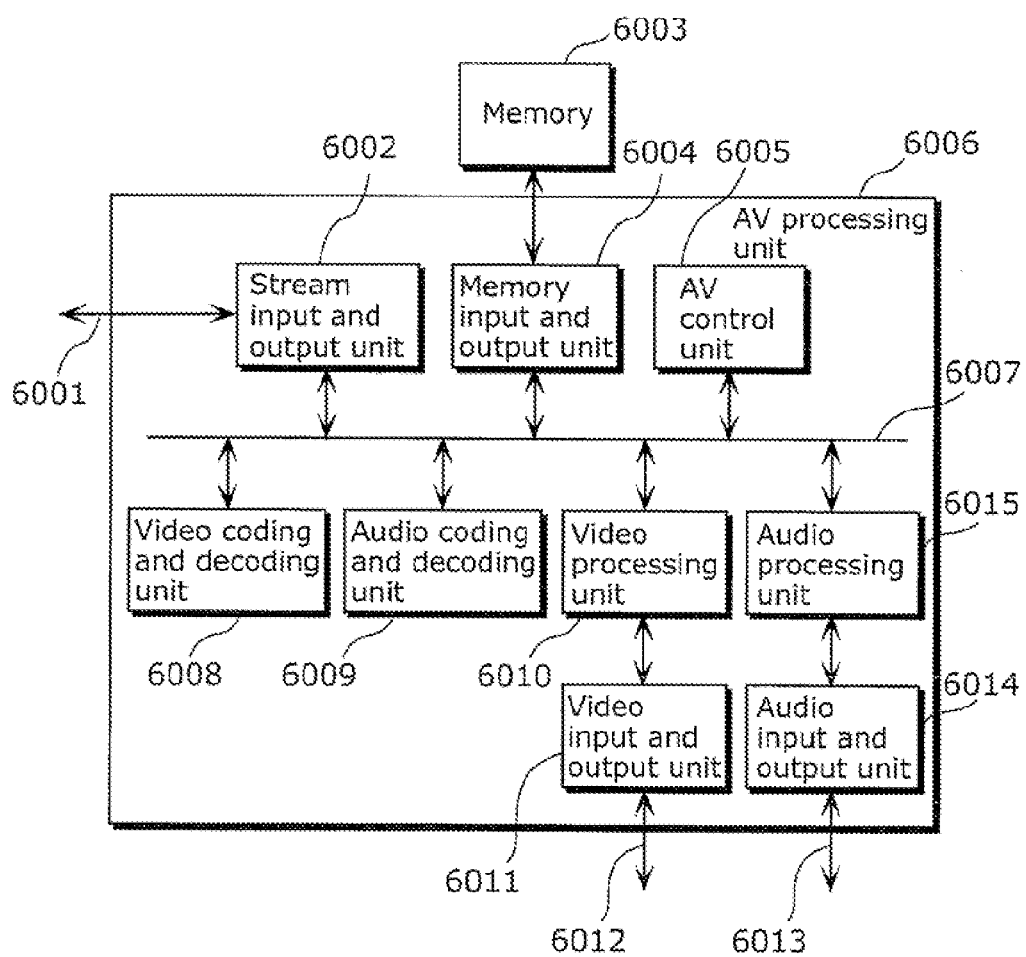
[FIG. 18]

FIG. 18 is a structural diagram of an AV (Audio Visual) processing unit which is implemented as a moving picture recorder.

In the diagram, the AV processing unit 6006 is a processing unit which reproduces audio and video that have been digitally compressed, and is, for example, a DVD (Digital Versatile Disk) recorder, a hard disk recorder, or the like.

The stream data 6001 is stream data containing audio and video. A video signal 6012 represents video data. An audio signal 6013 represents audio data.

A transfer bus 6007 is a bus for transferring data such as decoded audio or video data and stream data.

The stream input/output unit 6002 is a stream input/output unit for inputting/outputting the stream data 6001, and is connected to the transfer bus 6007. In addition, the stream input/output unit 6002 is connected to a large-capacity storage device, and outputs the stream data 6001 to the large-capacity storage device. In addition, the stream input/output unit 6002 receives the stream data 6001 as an input.

The video coding and decoding unit 6008 is intended to code and decode a video, and is connected to the transfer bus 6007.

The memory 6003 is a memory for storing data such as stream data, coded data, and decoded data, and is connected to the transfer bus 6007.

Here, the video coding and decoding unit 6008 includes, as a decoding circuit, the moving picture decoding device shown in any one of FIGS. 1, 4, 7, 10, 13, and 15. The stream data 6001 includes a coded stream. A signal communicated between the memory 6003 and the AV processing unit 6006 includes a decoded picture. A video signal 6012 may include a decoded video.

The video processing unit 6010 is intended to perform a pre-process and a post-process on a video signal, and is connected to the transfer bus 6007.

The video input/output unit 6011 is intended to either (i) output, to outside, video data signal that is a video signal 6012 processed by the video processing unit 6010 or passed through without being processed by the video processing unit 6010, or (ii) receive the video signal 6012 from outside.

The audio processing unit 6015 is intended to perform a pre-process and a post-process on an audio signal, and is connected to the transfer bus 6007.

The audio input/output unit 6014 is intended to either (i) output, to outside, audio data signal that is an audio signal 6013 processed by the audio processing unit 6015 or passed through without being processed by the audio processing unit 6015, or (ii) receive the audio signal 6013 from outside.

In addition, the AV control unit 6005 is intended to perform the integral control of the AV processing unit 6006.

The following operations are performed in coding.

First, a video signal 6012 is input to the video input/output unit 6011 in coding. Likewise, an audio signal 6013 is input to the audio input/output unit 6014.

Next, the video processing unit 6010 performs feature amount extraction etc. for filtering and coding, using the video signal 6012 input to the video input/output unit 6011. The video processing unit 6010 stores, as an original picture, the video signal 6012 in the memory 6003, via the memory input/output unit 6004.

Next, picture data and reference picture data are transferred from the memory 6003 to the video coding and decoding unit 6008 via the memory input/output unit 6004. Whereas, the video coding and decoding unit 6008 transfers, to the memory 6003, the video stream data coded by the video coding and decoding unit 6008 and locally reconstructed data.

On the other hand, the audio processing unit 6015 performs feature amount extraction etc. for filtering and coding, using the audio signal 6013 input to the audio input/output unit 6014. The video processing unit 6015 stores, as an original audio data, the audio signal 6013 in the memory 6003, via the memory input/output unit 6004.

Next, the audio processing unit 6015 extracts the original audio data from the memory 6003 via the memory input/output unit 6004 and codes the extracted original audio data, and stores it as audio stream data in the memory 6003.

Lastly in the coding, the AV control unit 6005 processes, as a single stream data, the video stream, audio stream, and other stream information, and outputs the stream data 6001 via the stream input/output unit 6002. The stream data 6001 is written in a large-capacity storage device such as an optical disk (DVD) and a hard disk (HDD).

The following operations are performed in decoding.

First, data stored through a recording process is read out from a large-capacity storage device such as an optical disk, a hard disk and a semiconductor memory. In this way, stream data 6001 containing audio and video is input via the stream input/output unit 6002. The video stream in the stream data 6001 is input to the video coding and decoding unit 6008, and the audio stream in the stream data 6001 is input to the audio coding and decoding unit 6009.

The video coding and decoding unit 6008 decodes the video data in the video stream. The video coding and decoding unit 6008 saves the decoded video data in the memory 6003 via the memory input/output unit 6004. The video processing unit 6010 performs processes such as noise removal on the data stored in the memory 6003. In addition, the picture data stored in the memory 6003 may be used as a reference picture for inter-picture prediction using motion compensation, by the video coding and decoding unit 6008.

In addition, the audio coding and decoding unit 6009 decodes the audio data in the audio stream. The audio coding and decoding unit 6009 saves the decoded audio data in the memory 6003 via the memory input/output unit 6004. The audio processing unit 6015 performs a process of adding acoustic effects etc. on the data stored in the memory 6003.

Lastly, the AV control unit 6005 causes, in temporal synchronization between audio and video, (i) output of data processed by the video processing unit 6010 as a video signal 6012 via the video input/output unit 6011 and (ii) output of data processed by the audio processing unit 6015 as an audio signal 6013 via the audio input/output unit 6014. The output video signal 6012 is displayed as video on a television screen. The output audio signal 6013 is output as sound through speakers or the like.

[Embodiment 9]

The processing described in each of the above-described embodiments can be simply implemented by an independent computer system, by recording, in a recording medium, a program for implementing the configuration for the moving picture decoding method described in each of the embodiments. The recording medium may be any recording medium for recording the program, such as a magnetic disk, an optical disk, a magnetic optical disk, an IC card, and a semiconductor memory.

Hereinafter, applications to the moving picture decoding methods described in the embodiments and a system using the same will be described.

Figure 19:
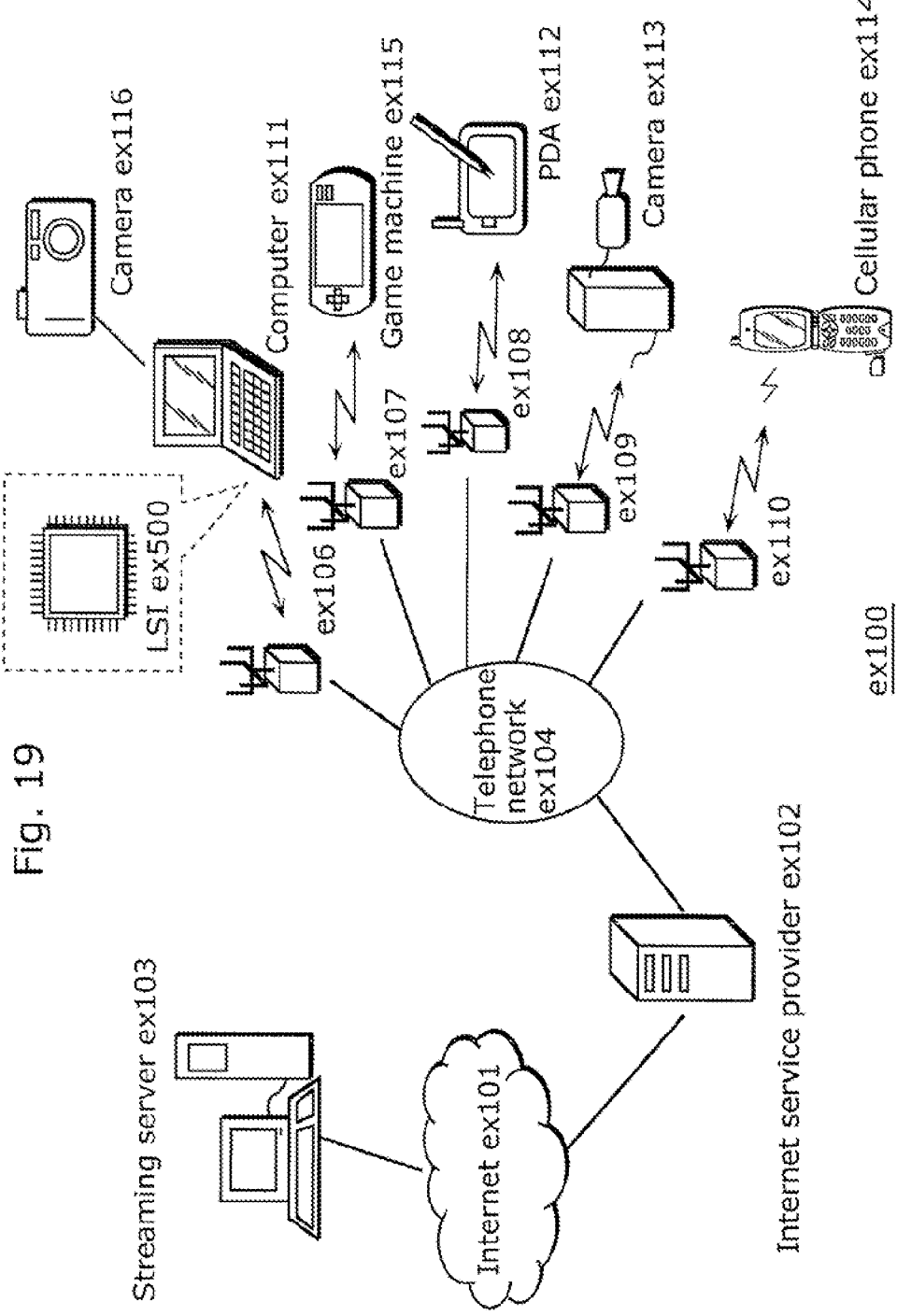
[FIG. 19]

FIG. 19 shows an overall configuration of a content providing system for implementing content distribution services. The area for providing communication services is divided into cells having a desired size, and each of base stations ex106 to ex110 which are fixed wireless stations is placed in a corresponding one of the cells.

The content providing system ex100 is connected to devices, such as a computer ex111, a personal digital assistant (PDA) ex112, a camera ex113, a cellular phone ex114, and a game machine ex115, via a telephone network ex104 as well as the base stations ex106 to ex110. Furthermore, each of the devices is connected to an Internet ex101 via an Internet service provider ex102.

However, the configuration of the content providing system ex100 is not limited to the configuration shown in FIG. 19, and a combination in which any of the elements are combined is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving pictures. A camera ex116, such as a digital video camera, is capable of capturing both still pictures and moving pictures. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still pictures and moving pictures captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or plural chips. Software for coding and decoding pictures may to be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may divide data and process, record, and distribute the divided data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 20:
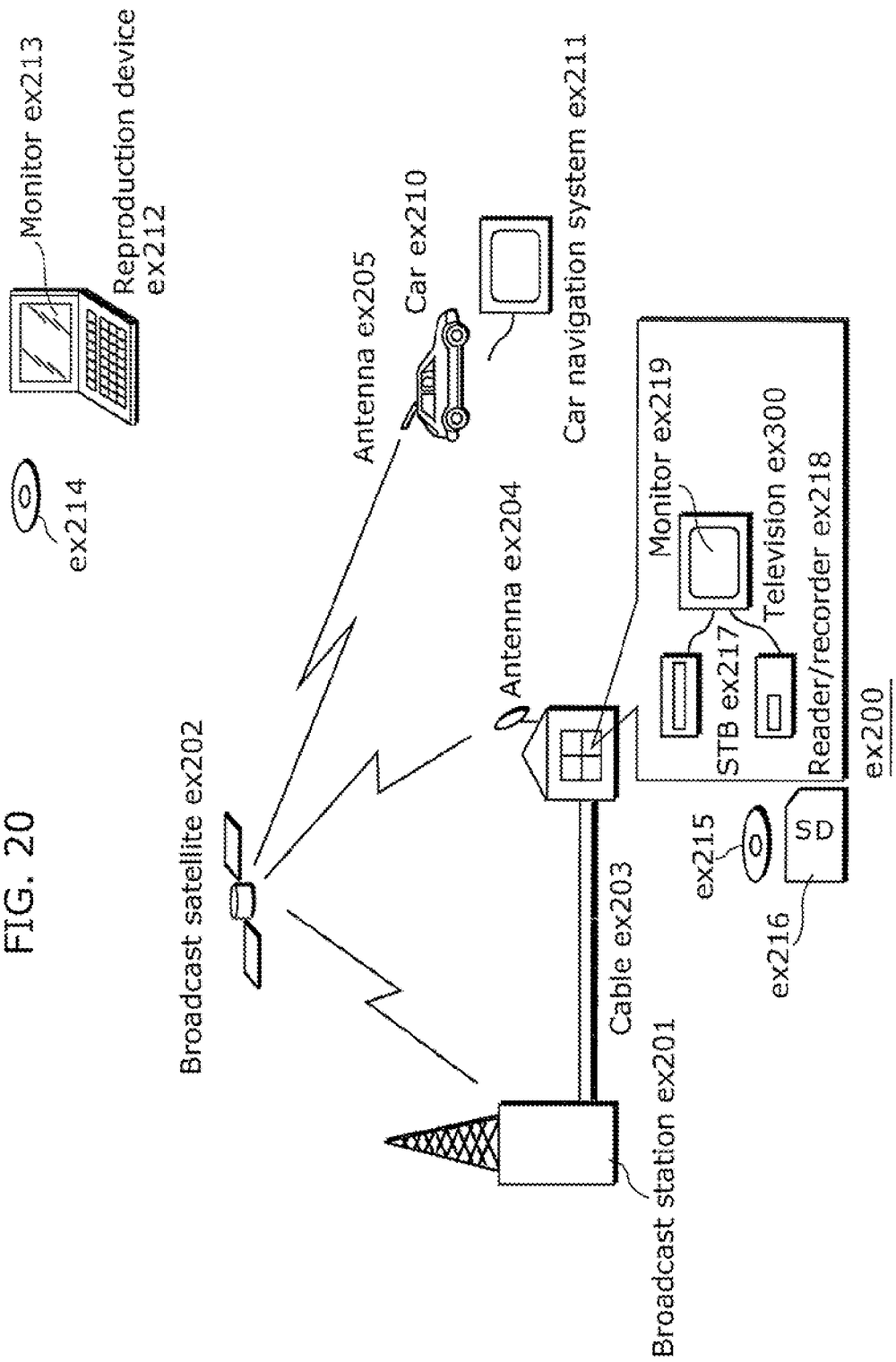
[FIG. 20]

The present invention is not limited to the example of the content providing system ex100, and the moving picture decoding devices in each of the embodiments can be incorporated into a digital broadcasting system ex200 as shown in FIG. 20. More specifically, a broadcast station ex201 communicates or transmits a bitstream of video information via radio waves to a broadcast satellite ex202. The bitstream is a coded bitstream obtained by the moving picture coding method corresponding to the moving picture decoding method according to each of the embodiments. Upon receipt of the bitstream, the broadcast satellite ex202 transmits radio waves for broadcasting. Then, a home-use antenna ex204 with a satellite broadcast reception function receives the radio waves. A device, such as a television (receiver) ex300 and a set top box (STB) ex217 decodes the received coded bitstream and reproduces the decoded bitstream.

Furthermore, a reproduction device ex212 that reads and decodes the bit stream recorded onto a recording medium ex214, such as a CD and a DVD, may include the moving picture decoding device as shown in each of the embodiments. In this case, the reproduced video signals are displayed on the monitor ex213.

Furthermore, the moving picture decoding device as shown in each of the embodiments can be included in the reader/recorder ex218 (i) for reading and decoding a coded bit stream recorded on a recording medium ex215 such as a BD and a DVD, or (ii) for coding and writing video signals onto the recording medium ex215. Here, the reproduced video signals are displayed on a monitor ex219, and can be reproduced by another device or system, using the recording medium ex215 on which the coded bit stream is recorded. Furthermore, it is also possible to implement the moving picture decoding device in the set top box ex217 connected to the cable ex203 for a cable television or the antenna ex204 for satellite and/or terrestrial broadcasting, so as to display the video signals on the monitor ex219 of the television ex300. The moving picture decoding device may be included not in the set top box but in the television ex300.

Figure 21:
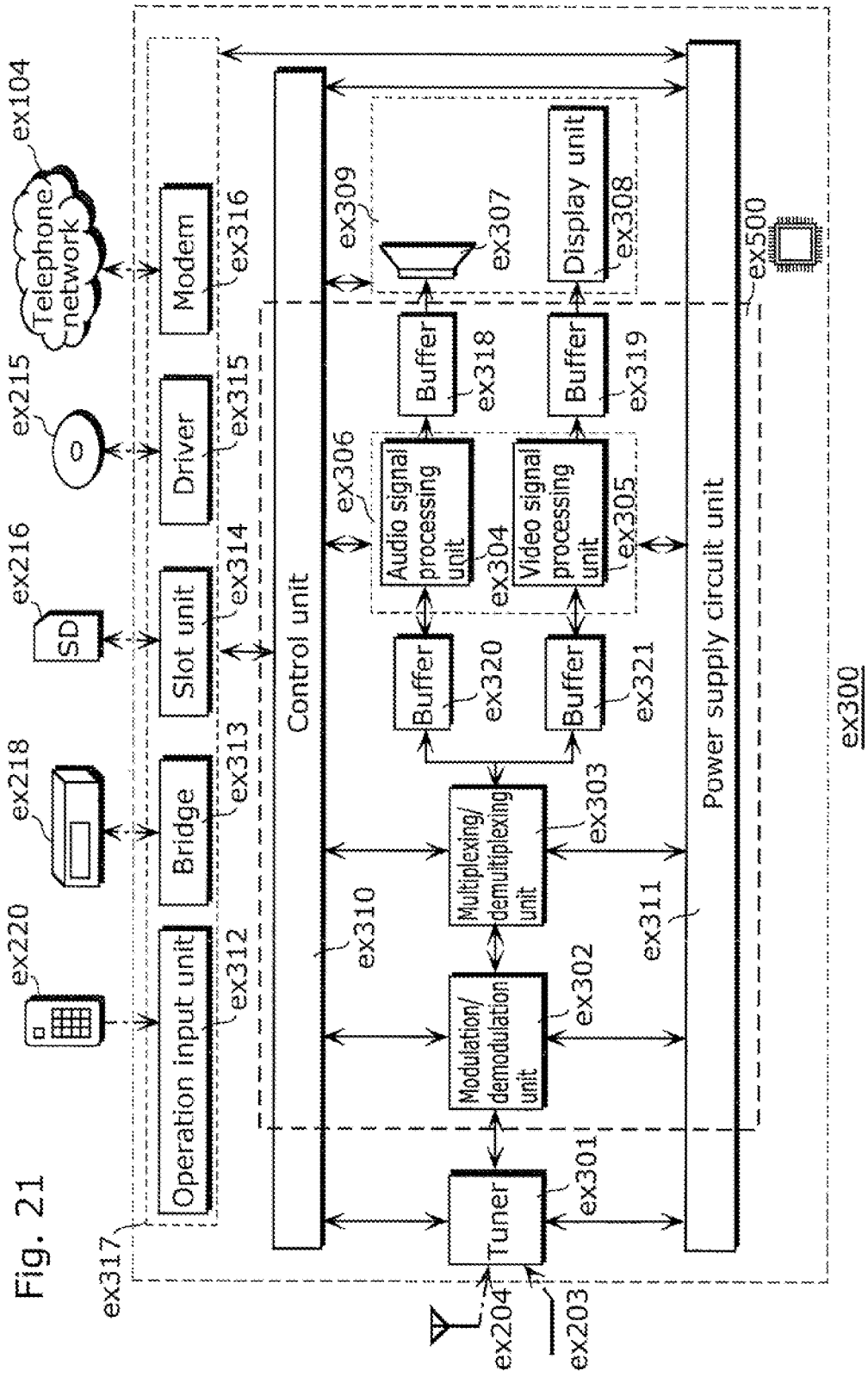
[FIG. 21]

FIG. 21 illustrates the television (receiver) ex300 that uses the moving picture decoding method described in each of the embodiments. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data.

The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that integrally controls all the constituent elements of the television ex300, and a power supply circuit unit ex311 that supplies power to each of the elements.

In addition to the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage.

The constituent elements of the television ex300 are connected to each other through a synchronous bus.

First, a description is given of a configuration in which the television ex300 decodes data obtained from outside through the antenna ex204 and others and reproduces the decoded data. In the television ex300, upon receipt of a user operation from a remote controller ex220 or the like, the multiplexing/demultiplexing unit ex303 demultiplexes the video data and audio data demodulated by the modulation/demodulation unit ex302, under control of the control unit ex310 including a CPU. Furthermore, in the television ex300, the audio signal processing unit ex304 decodes the demultiplexed audio data and the video signal processing unit ex305 decodes the demultiplexed video data, using the decoding method described in each of the embodiments. The output unit ex309 outputs each of the decoded video signal and audio signal. When the output unit ex309 outputs the video signal and the audio signal, the signals may be temporarily stored in buffers ex318 and ex319, or the like so that the signals are reproduced in synchronization with each other. Furthermore, the television ex300 may read a coded bitstream not through a broadcast or the like but from the recording media ex215 and ex216, such as a magnetic disk, an optical disk, and a SD card.

Next, a description is given of a configuration in which the television ex300 codes an audio signal and a video signal, and transmits the data outside or writes the data on a recording medium. In the television ex300, upon receipt of a user operation from the remote controller ex220 or the like, the audio signal processing unit ex304 codes an audio signal, and the video signal processing unit ex305 codes a video signal using the coding method corresponding to the moving picture decoding method as described in each of the embodiments, under control of the control unit ex310. The multiplexing/demultiplexing unit ex303 multiplexes the coded video signal and audio signal, and outputs the resulting signal outside. When the multiplexing/demultiplexing unit ex303 multiplexes the video signal and the audio signal, the signals may be temporarily stored in buffers ex320 and ex321, or the like so that the signals are reproduced in synchronization with each other.

Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include, an element for receiving an AV input from a microphone or a camera in addition to the element for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 22:
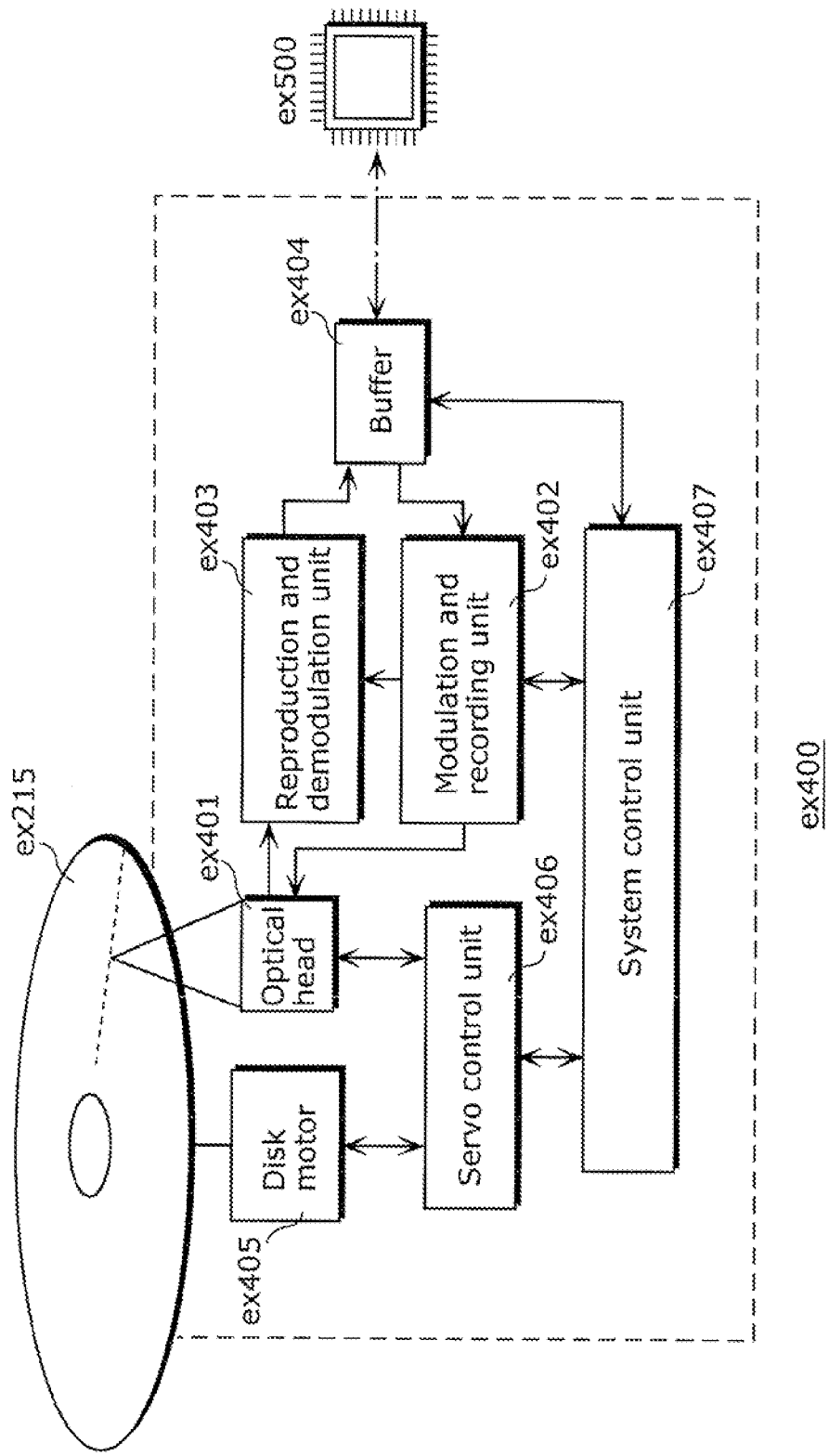
[FIG. 22]

As an example, FIG. 22 illustrates a configuration of an information reproducing/recording unit ex400 when data is read or written from or in an optical disk. The information reproducing/recording unit ex400 includes constituent elements ex401 to ex407 to be described hereinafter.

The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot.

The system control unit ex407 controls overall the information reproducing/recording unit ex400. The system control unit ex407 implements the reading and writing processes by (i) generating and adding new information as necessary, based on various information stored in the buffer ex404, and (ii) recording and reproducing information through the optical head ex401 while causing the modulation recording unit ex402, the reproduction demodulating unit ex403, and the servo control unit ex406 to operate in a coordinated manner.

The system control unit ex407 includes, for example, a microprocessor, and executes processing by causing a computer to execute a program for read and write.

Although the optical head ex401 irradiates a laser spot in the description, it may perform high-density recording using near field light.

Figure 23:
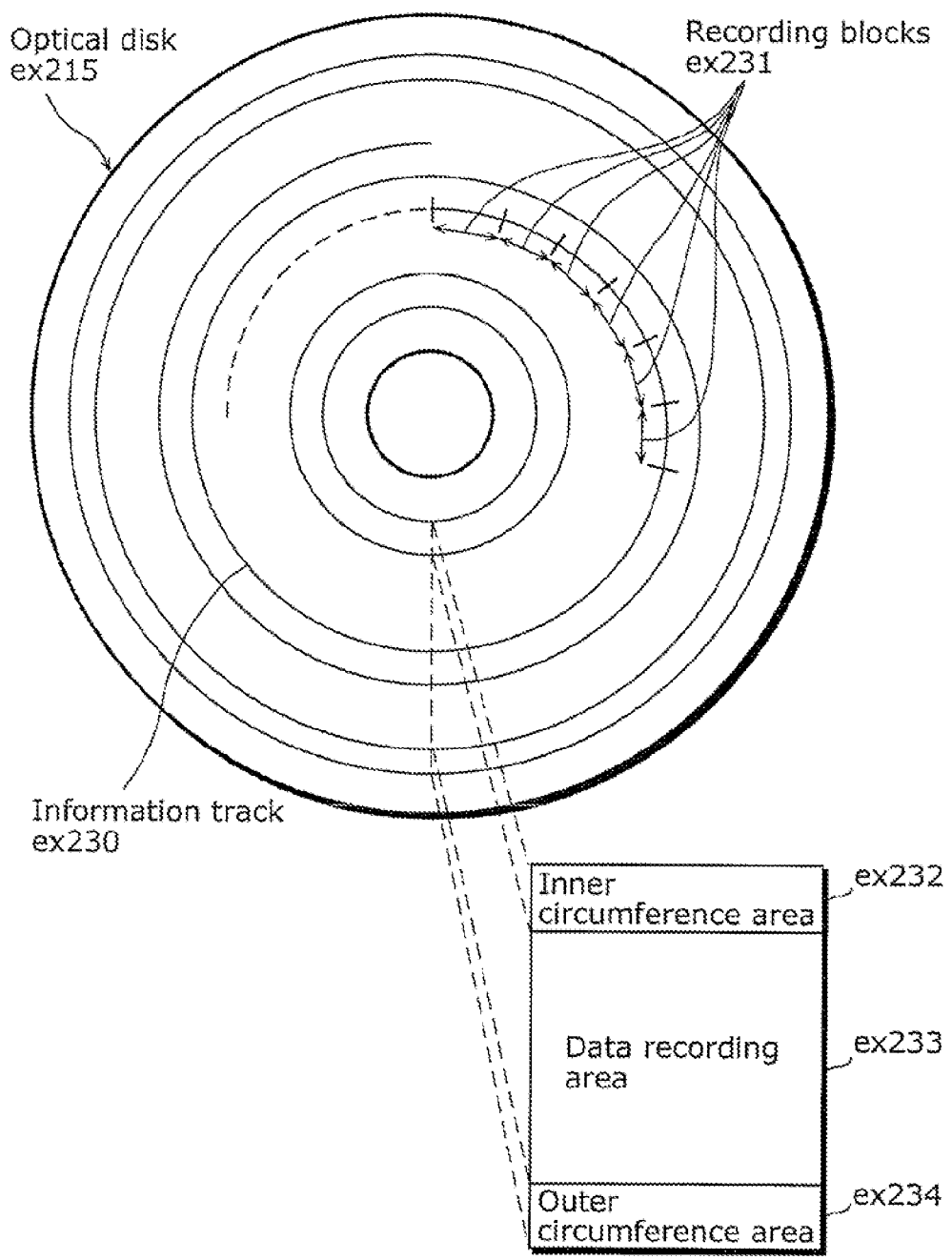
[FIG. 23]

FIG. 23 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit of recording data. A device that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data.

The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of recording on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others. Furthermore, similarly to the television ex300, a terminal such as the cellular phone ex114 may have three types of implementation configurations including not only (i) a transmitting and receiving terminal including both a coding device and a decoding device, but also (ii) a transmitting terminal including only a coding device and (iii) a receiving terminal including only a decoding device.

As such, the moving picture decoding method in each of the embodiments can be used in any of the devices and systems described. Thus, the advantageous effects described in the embodiments can be obtained.

Furthermore, the present invention is not limited to the above-described embodiments, and various modifications and revisions are possible without departing from the scope of the present invention.

[Embodiment 10]

Figure 24:
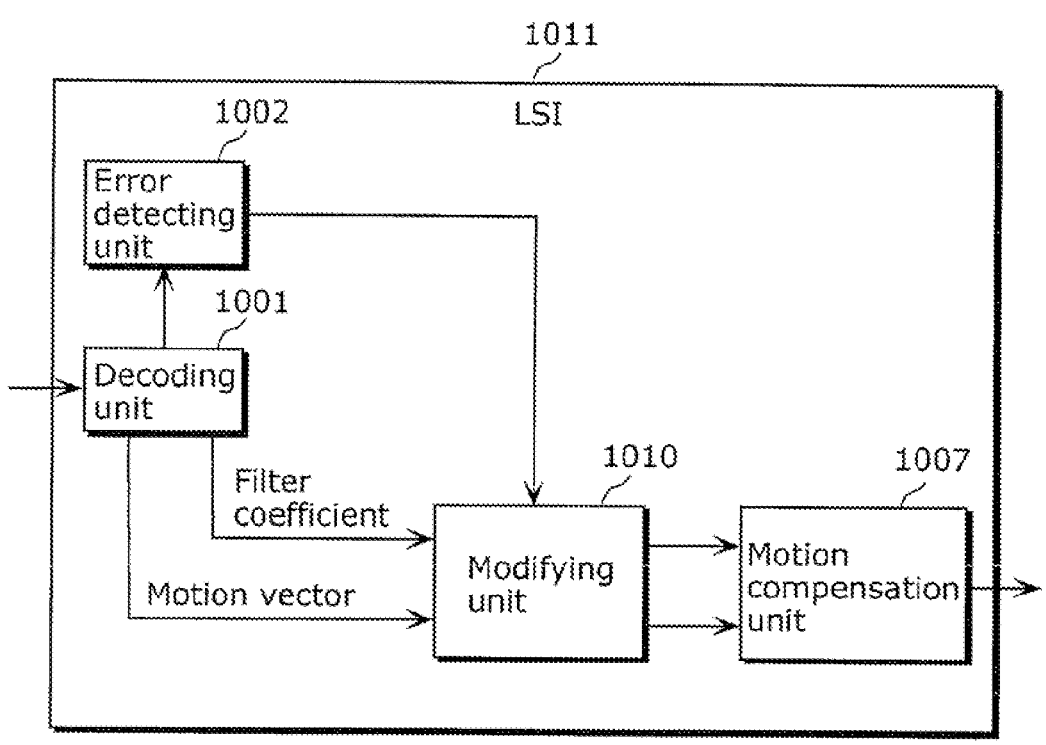
[FIG. 24]

The moving picture decoding device shown in Embodiment 6 is typically implemented as an LSI that is a semiconductor integrated circuit. FIG. 24 illustrates an embodiment. Each of the constituent elements of the moving picture decoding device is implemented on the LSI illustrated in FIG. 24.

Each of the elements may be made into one chip individually, or a part or an entire thereof may be made into one chip. The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks.

One such possibility is that the present invention is applied to biotechnology.

In addition, a combination of a semiconductor chip obtained by integrating the moving picture decoding device according to any one of the embodiments and a display for drawing images may configure a drawing device for various uses. The present invention can be applied to an information drawing unit in a cellular phone, a television, a digital video recorder, a digital video camera, and a car navigation system. The displays may be combinations of (i) a cathode-ray tube (CRT), (ii) a flat display such as a liquid crystal display, a plasma display panel (PDP), an organic EL device, and (iii) a projection display represented by a projector.

Furthermore, the LSI according to each of the embodiments may perform coding and decoding processes in coordination with a bitstream buffer that stores coded streams and a Dynamic Random Access Memory (DRAM) including a frame memory that stores pictures. Furthermore, the LSI according to each of the embodiments may be in in coordination with not the DRAM but an eDRAM (embeded DRAM), Static Random Access Memory (SRAM), or other storage devices such as hard disk.

It is to be noted that, in this embodiment, the moving picture decoding device shown in Embodiment 6 is implemented as an LSI. Likewise, the moving picture decoding device described in any one of Embodiments 1 to 5 may be implemented as an LSI.

[Embodiment 11]

Figure 25:
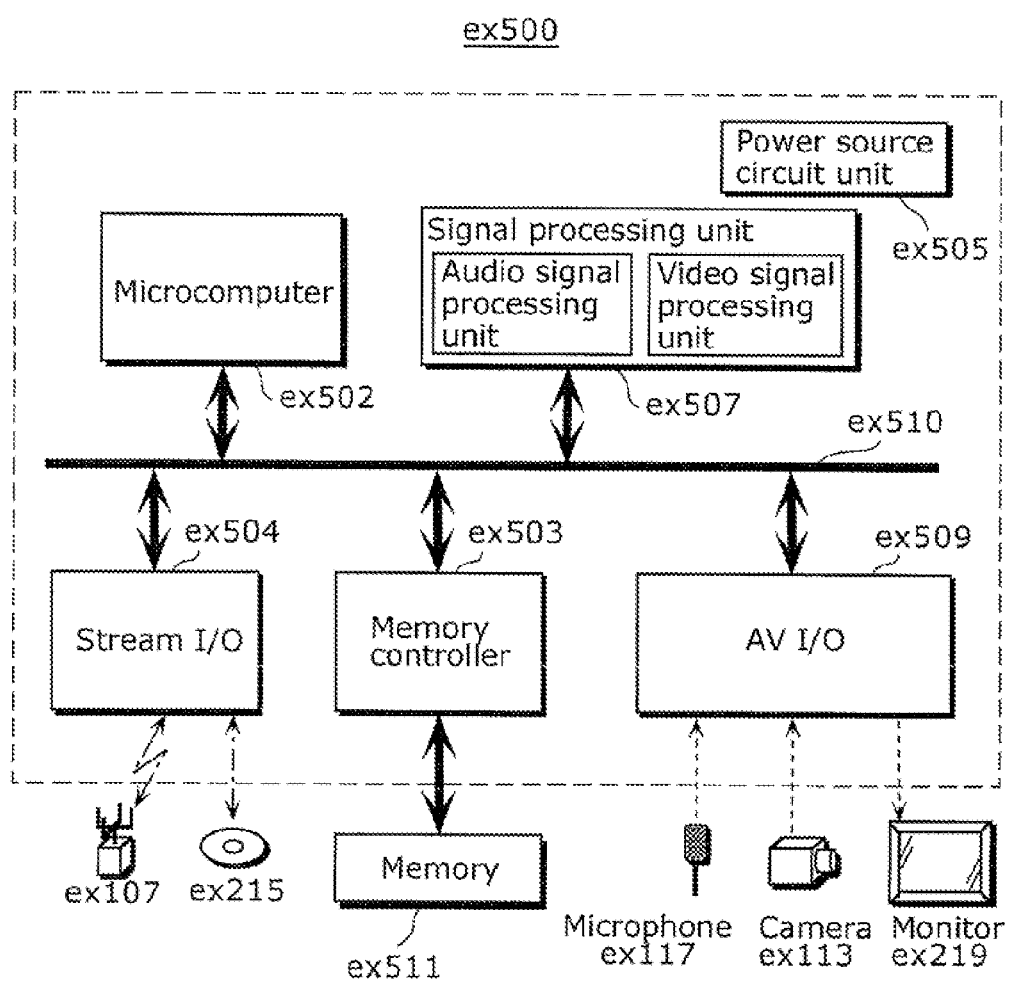
[FIG. 25]

Each of the moving picture decoding methods and the moving picture decoding devices in the respective embodiments is typically implemented by an integrated circuit. As an example, FIG. 25 illustrates a configuration of an LSI ex500 that is made into one chip. The LSI ex500 includes elements ex502 to ex509 to be described below, and the elements are connected to each other through a bus ex510. The power supply circuit unit ex505 is activated by supplying each of the elements with power when power is on.

For example, when coding is performed, the LSI ex500 receives an input of an AV signal from a microphone ex117, a camera ex113, and others through an AV I/O ex509. The received AV signal is temporarily stored in a memory ex511 such as an SDRAM outside the LSI ex500. The stored data is subdivided into data portions according to the processing amount and speed as necessary. Then, the data portions are transmitted to a signal processing unit ex507. The signal processing unit ex507 codes an audio signal and/or a video signal. Here, the coding of the video signal, is the coding corresponding to decoding described in each of the embodiments. Furthermore, the signal processing unit ex507 sometimes multiplexes the coded audio data and the coded video data, and a stream I/O ex504 provides the multiplexed data outside. The provided bit stream is transmitted to a base station ex107, or written into a recording medium ex215.

For example, when coded data is decoded, the LSI ex500 temporarily stores, in the memory ex511 etc., the coded data obtained from the base station ex107 through the stream I/O ex504 or read from the recording medium ex215 under control of a microcomputer ex502. The stored data is subdivided into data portions according to the processing amount and speed as necessary, under control of the microcomputer ex502, and the data portions are transmitted to the signal processing unit ex507. The signal processing unit ex507 decodes the audio data and/or the video data. Here, the decoding of the video signal is the decoding described in each of the embodiments. Furthermore, a decoded audio signal and a decoded video signal may be temporarily stored in the memory ex511 etc. so that the signals can be reproduced in synchronization with each other. The decoded output signals are provided from the AV I/O ex509 to the monitor ex219 through the memory ex511 etc. as necessary. The LSI ex500 has the configuration in which the memory ex511 is accessed through the memory controller ex503.

Although the above memory ex511 is described as a device outside the LSI ex500, the memory ex511 may be configured inside the LSI ex500. All of the elements of LSI ex500 may be integrated into a single chip or each of the elements may be configured as a chip.

The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, when a circuit integration technology for replacing LSIs with new circuits appears in the future with advancement in semiconductor technology and derivative other technologies, the circuit integration technology may be naturally used to integrate functional blocks. Application of biotechnology is one such possibility.

The moving picture decoding device in each of the above-described embodiments modifies either a motion vector or a filter coefficient, when an error is detected in the filter coefficient. Accordingly, the moving picture decoding device can continue the motion compensation.

Although the moving picture decoding method according to the present invention has been described based on the above embodiments, but the present invention is not limited to the embodiments. Those skilled in the art will readily appreciate that many modifications are possible in the exemplary embodiments, and also other embodiments are obtainable by arbitrarily combining the structural elements in the embodiments. Accordingly, all such modifications and other embodiments are intended to be included within the scope of the present invention.

Furthermore, the present invention can be implemented not only as a moving picture decoding device, but also as a method having the steps corresponding to the processing units of the moving picture decoding device. Furthermore, the present invention can be implemented as a program causing a computer to execute the steps. Furthermore, the present invention can be implemented as a recording medium such as a computer-readable CD-ROM having the program recorded thereon.

Industrial Applicability

As described above, the moving picture decoding device according to the present invention is applicable in video decoding devices and video display devices such as cellular phones, DVD devices, BD (Blu-ray Disc) devices, personal computers, visual telephones, set top boxes, digital televisions, automobiles, security systems etc.

[Reference Signs List]
1001 Decoding unit
1002 Error detecting unit
1006 Frame memory
1007 Motion compensation unit
1008 Adder unit
1010 Modifying unit
1011, ex500 LSI (Large Scale Integrated circuit)
1012, 6003, ex511 Memory
3003 Filter coefficient memory unit
4003 Filter coefficient generating unit
5009 Motion vector error concealing unit
6001 Stream data
6002 Stream input/output unit
6004 Memory input/output unit
6005 AV control unit
6006 AV processing unit
6007 Transfer bus
6008 Video coding and decoding unit
6009 Audio coding and decoding unit
6010 Video processing unit
6011 Video input/output unit
6012 Video signal
6013 Audio signal
6014 Audio input/output unit
6015 Audio processing unit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA (Personal Digital Assistant)
ex113, ex116 Camera
ex114 Cellular phone
ex115 Game machine
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction device
ex213, ex219 Monitor
ex214, ex215, ex216 Recording medium
ex217 Set top box (STB)
ex218 Reader/recorder
ex220 Remote controller
ex230 Information track
ex231 Recording blocks
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308 Display unit
ex309 Output unit
ex310 Control unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction and demodulation unit
ex405 Disk motor
ex406 Servo control unit
ex407 System control unit
ex502 Micro computer
ex503 Memory controller
ex504 Stream I/O
ex509 AV I/O
ex510 Bus

The invention claimed is:

1. A moving picture decoding device which performs motion compensation, said device comprising:
a decoding unit configured to obtain header information by decoding a coded stream, the header information including (i) a motion vector indicating a sub-pixel position and (ii) a filter coefficient for identifying a pixel value at the sub-pixel position;
an error detecting unit configured to determine that the filter coefficient has an error when the filter coefficient has a format different from a predetermined format;
a modifying unit configured to modify the motion vector so as to enable identification of a pixel value at a pixel position for use in motion compensation, when said error detecting unit determines that the filter coefficient has the error; and
a motion compensation unit configured to perform motion compensation by identifying the pixel value at the pixel position using the modified motion vector, when said error detecting unit determines that the filter coefficient has the error.

2. The moving picture decoding device according to claim 1,
wherein said modifying unit is configured to modify the motion vector into a motion vector indicating an integer pixel position, when said error detecting unit determines that the filter coefficient has the error, and
wherein said motion compensation unit is configured to perform the motion compensation by identifying the pixel value at the integer pixel position indicated by the modified motion vector, when said error detecting unit determines that the filter coefficient has the error.

3. The moving picture decoding device according to claim 2,
wherein said modifying unit is configured to modify the motion vector by rounding down, rounding up, or rounding off a decimal portion of the motion vector, when said error detecting unit determines that the filter coefficient has the error.

4. The moving picture decoding device according to claim 2,
wherein said modifying unit is configured to modify the motion vector into zero, when said error detecting unit determines that the filter coefficient has the error.

5. An integrated circuit which performs motion compensation, said circuit comprising:
a decoding unit configured to obtain header information by decoding a coded stream, the header information including (i) a motion vector indicating a sub-pixel position and (ii) a filter coefficient for identifying a pixel value at the sub-pixel position;
an error detecting unit configured to determine that the filter coefficient has an error when the filter coefficient has a format different from a predetermined format;
a modifying unit configured to modify the motion vector so as to enable identification of a pixel value at a pixel position for use in motion compensation, when said error detecting unit determines that the filter coefficient has the error; and
a motion compensation unit configured to perform motion compensation by identifying the pixel value at the pixel position using the modified motion vector, when said error detecting unit determines that the filter coefficient has the error.

6. A moving picture decoding method of performing motion compensation, said method comprising:
obtaining header information by decoding a coded stream, the header information including (i) a motion vector indicating a sub-pixel position and (ii) a filter coefficient for identifying a pixel value at the sub-pixel position;
determining that the filter coefficient has an error when the filter coefficient has a format different from a predetermined format;
modifying the motion vector so as to enable identification of a pixel value at a pixel position for use in motion compensation, when said determining determines that the filter coefficient has the error; and
performing motion compensation by identifying the pixel value at the pixel position using the modified motion vector, when said determining determines that the filter coefficient has the error.

7. A moving picture decoding system which performs motion compensation, said system comprising:
an integrated circuit which performs motion compensation; and
a memory for storing a reference picture,
wherein said integrated circuit including:
a decoding unit configured to obtain header information by decoding a coded stream, the header information including (i) a motion vector indicating a sub-pixel position and (ii) a filter coefficient for identifying a pixel value at the sub-pixel position;
an error detecting unit configured to determine that the filter coefficient has an error when the filter coefficient has a format different from a predetermined format;
a modifying unit configured to modify the motion vector so as to enable identification of a pixel value at a pixel position for use in motion compensation, when said error detecting unit determines that the filter coefficient has the error; and
a motion compensation unit configured to perform motion compensation by identifying the pixel value at the pixel position using the modified motion vector, when said error detecting unit determines that the filter coefficient has the error.

8. A non-transitory computer-readable recording medium having a program recorded thereon, the program causing a computer to execute a moving picture decoding method of performing motion compensation, the method comprising:
obtaining header information by decoding a coded stream, the header information including (i) a motion vector indicating a sub-pixel position and (ii) a filter coefficient for identifying a pixel value at the sub-pixel position;
determining that the filter coefficient has an error when the filter coefficient has a format different from a predetermined format;
modifying the motion vector so as to enable identification of a pixel value at a pixel position for use in motion compensation, when said determining determines that the filter coefficient has the error; and
performing motion compensation by identifying the pixel value at the pixel position using the modified motion vector, when said determining determines that the filter coefficient has the error.

* * * * *